(12) United States Patent
Morifuji et al.

(10) Patent No.: US 10,636,125 B2
(45) Date of Patent: Apr. 28, 2020

(54) IMAGE PROCESSING APPARATUS AND METHOD

(71) Applicant: SONY CORPORATION, Tokyo (JP)

(72) Inventors: Takafumi Morifuji, Tokyo (JP); Tomonori Tsutsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 130 days.

(21) Appl. No.: 15/568,066

(22) PCT Filed: Apr. 25, 2016

(86) PCT No.: PCT/JP2016/062879
§ 371 (c)(1),
(2) Date: Oct. 20, 2017

(87) PCT Pub. No.: WO2016/181804
PCT Pub. Date: Nov. 17, 2016

(65) Prior Publication Data
US 2018/0144446 A1    May 24, 2018

(30) Foreign Application Priority Data

May 8, 2015  (JP) ................................ 2015-096018

(51) Int. Cl.
*G06K 9/00*    (2006.01)
*G06T 5/00*    (2006.01)
(Continued)

(52) U.S. Cl.
CPC ............ *G06T 5/003* (2013.01); *G06F 3/1446* (2013.01); *G06T 5/001* (2013.01); *G06T 7/0002* (2013.01);
(Continued)

(58) Field of Classification Search
CPC .... H04N 13/30; H04N 9/3194; H04N 9/3182; H04N 9/3147; H04N 5/66;
(Continued)

(56) References Cited

U.S. PATENT DOCUMENTS 6,839,081 B1 * 1/2005 Iijima ....................... G06T 7/20
348/46
6,906,762 B1   6/2005 Witehira et al.
(Continued)

FOREIGN PATENT DOCUMENTS

CN         1294695 A     5/2001
CN       101470215 A     7/2009
(Continued)

OTHER PUBLICATIONS

International Search Report and Written Opinion of PCT Application No. PCT/JP2016/062879, dated Jul. 19, 2016, 10 pages of ISRWO.

Primary Examiner — Aaron W Carter
(74) Attorney, Agent, or Firm — Chip Law Group

(57) ABSTRACT

The present disclosure relates to an image processing apparatus and a method which enable a sense of quality as if there were a real object to be more favorably reproduced. A characteristic control unit determines processing contents for controlling the sense of quality, for example, changing an image quality, adjusting a reflection characteristic, or changing a shape, on the basis of a physical characteristic parameter from a characteristic information integration unit and device information from a device information analyzer. The characteristic control unit supplies information on the determined processing contents to an image composition unit and an additional-information generation unit and causes the image composition unit and the additional-information generation unit to perform sense-of-quality control. That is, in the image processing apparatus, more realistic visual expres- (Continued)

sion becomes possible with an image output of one device as well as an output other than an image from another device.

6 Claims, 18 Drawing Sheets

(51) Int. Cl.

| | | |
|---|---|---|
| *G09G 5/00* | (2006.01) | |
| *H04N 13/30* | (2018.01) | |
| *G09G 3/00* | (2006.01) | |
| *G09G 5/14* | (2006.01) | |
| *G06F 3/14* | (2006.01) | |
| *H04N 9/31* | (2006.01) | |
| *G09G 5/02* | (2006.01) | |
| *G06T 7/50* | (2017.01) | |
| *G06T 7/90* | (2017.01) | |
| *G06T 7/00* | (2017.01) | |
| *G06T 7/40* | (2017.01) | |
| *G09G 3/36* | (2006.01) | |
| *H04N 5/66* | (2006.01) | |

(52) U.S. Cl.
CPC .............. *G06T 7/40* (2013.01); *G06T 7/50* (2017.01); *G06T 7/90* (2017.01); *G09G 3/001* (2013.01); *G09G 3/003* (2013.01); *G09G 3/005* (2013.01); *G09G 3/3607* (2013.01); *G09G 5/00* (2013.01); *G09G 5/026* (2013.01); *G09G 5/14* (2013.01); *H04N 9/3147* (2013.01); *H04N 9/3182* (2013.01); *H04N 9/3194* (2013.01); *H04N 13/30* (2018.05); *G06T 2207/10024* (2013.01); *G06T 2207/30168* (2013.01); *G09G 2340/14* (2013.01); *G09G 2360/144* (2013.01); *H04N 5/66* (2013.01)

(58) Field of Classification Search
CPC ......... G09G 2360/144; G09G 2340/14; G09G 5/14; G09G 5/026; G09G 5/00; G09G 3/3607; G09G 3/005; G09G 3/003; G09G 3/001; G06T 2207/30168; G06T 2207/10024; G06T 7/90; G06T 7/50; G06T 7/40; G06T 7/0002; G06T 5/003; G06T 5/001; G06F 3/1446
See application file for complete search history.

(56) References Cited

U.S. PATENT DOCUMENTS

| | | | |
|---|---|---|---|
| 7,002,623 B1* | 2/2006 | Ohyama | H04N 1/6088 348/225.1 |
| 9,672,650 B2* | 6/2017 | Kondo | G06F 3/1446 |
| 2004/0046939 A1* | 3/2004 | Nakamura | G03B 42/08 353/7 |
| 2006/0104539 A1* | 5/2006 | Kim | G06T 3/40 382/276 |
| 2009/0179910 A1 | 7/2009 | Inoue et al. | |
| 2012/0194433 A1* | 8/2012 | Imai | G06T 11/001 345/158 |
| 2014/0340415 A1 | 11/2014 | Morifuji et al. | |
| 2016/0019705 A1* | 1/2016 | Kondo | G06F 3/1446 382/284 |
| 2017/0039732 A1* | 2/2017 | Morifuji | H04N 1/407 |
| 2018/0129909 A1* | 5/2018 | Tsutsumi | G06K 9/6247 |
| 2018/0144446 A1* | 5/2018 | Morifuji | G09G 5/00 |
| 2019/0129674 A1* | 5/2019 | Kuwada | G09G 3/00 |

FOREIGN PATENT DOCUMENTS

| | | |
|---|---|---|
| CN | 104159023 A | 11/2014 |
| EP | 1057070 A1 | 12/2000 |
| EP | 2075783 A1 | 7/2009 |
| JP | 2001-333438 A | 11/2001 |
| JP | 2001-333438 B2 | 11/2001 |
| JP | 3335998 B2 | 10/2002 |
| JP | 2009-157075 A | 7/2009 |
| JP | 2011-248209 A | 12/2011 |
| JP | 2013-195537 A | 9/2013 |
| JP | 2014-222447 A | 11/2014 |
| KR | 10-2009-0071441 A | 7/2009 |
| WO | 1999/042889 A1 | 8/1999 |
| WO | 2010/087162 A1 | 8/2010 |

* cited by examiner

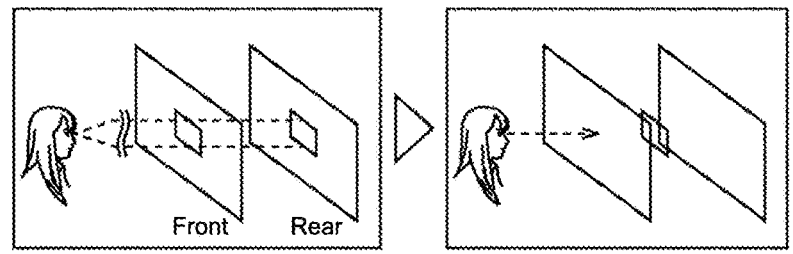
FIG. 5A
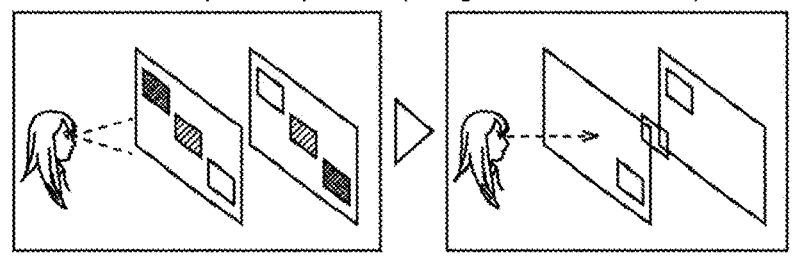
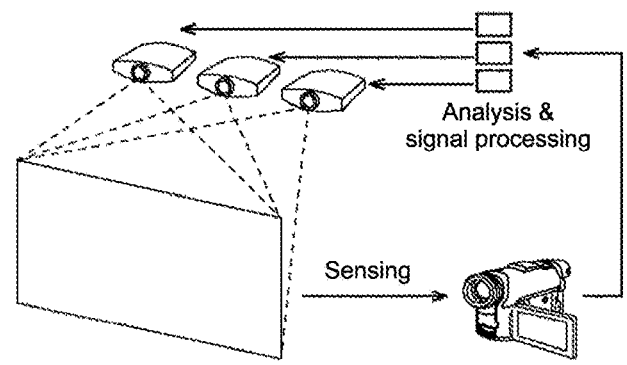
FIG. 5B
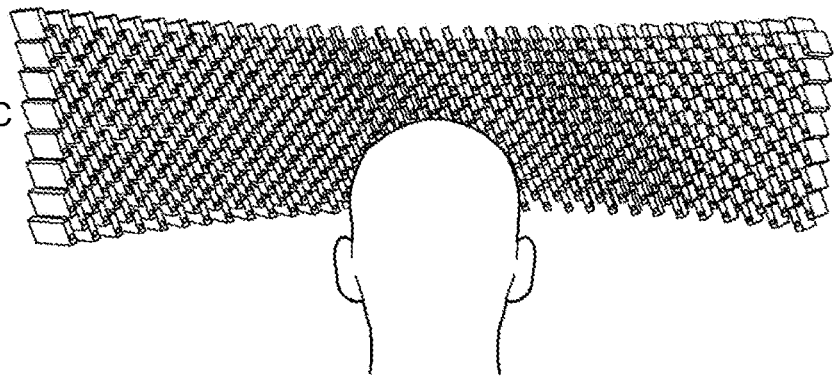
FIG. 5C

| Output target | Plurality of information outputs | | Effect |
| --- | --- | --- | --- |
| Multi-layer display | Object on front side | Object on deep side | Emphasis of stereoscopic sense |
| | Diffuse reflection component | Specular reflection component | Enhance shininess utilizing dynamic range |
| | Object color | Light source color | Display invariable object color on electronic paper<br>Reduce power consumption by displaying difference on LCD |
| Multiple projectors | Diffuse reflection component | Specular reflection component | Enhance shininess utilizing dynamic range |
| LCD, OLED | Diffuse reflection component | Specular reflection component | Keep visibility by lowering specular reflection component<br>Reduce power consumption and prevent screen burn-in |
| Tactile display | Structure component | Texture component | Reproduce sense of touch utilizing texture component |
| Video + audio | Video | Audio corresponding to material | Output audio corresponding to object |
| | Luminance information | Color information (wavelength) | |
| | Focused | Unfocused | |
| | High-frequency component | Low-frequency component | |

IMAGE PROCESSING APPARATUS AND METHOD

CROSS REFERENCE TO RELATED APPLICATIONS

This application is a U.S. National Phase of International Patent Application No. PCT/JP2016/062879 filed on Apr. 25, 2016, which claims priority benefit of Japanese Patent Application No. JP 2015-096018 filed in the Japan Patent Office on May 8, 2015. Each of the above-referenced applications is hereby incorporated herein by reference in its entirety.

TECHNICAL FIELD

The present disclosure relates to image processing apparatus and method and more particularly to image processing apparatus and method which enable a sense of quality as if there were a real object to be more favorably reproduced.

BACKGROUND ART

For the purpose of improving the realisticness of videos, technologies of adjusting the contrast, the fineness, and the like have been developed.

Note that Patent Literature 1 has proposed a technology to realize a color correction and desired color reproduction of an object in an image and improve the image quality.

CITATION LIST

Patent Literature

Patent Literature 1: WO2010/087162

DISCLOSURE OF INVENTION

Technical Problem

However, it has been difficult to further improve the performance only by improving the basic image quality such as the contrast and the fineness. Thus, it is desirable to reproduce a sense of quality as if there were a real object, for example, visually reproduce a situation as if an object were actually seen.

The present disclosure has been made in view of the above-mentioned circumstances to be capable of more favorably reproducing a sense of quality as if there were a real object.

Solution to Problem

An image processing apparatus according to an aspect of the present disclosure includes: a physical-characteristic parameter acquisition unit that acquires a physical characteristic parameter regarding an object of an image; a sense-of-quality control unit that controls a sense of quality of the object in the image by using the physical characteristic parameter acquired by the physical-characteristic parameter acquisition unit; and a plurality of output units that respectively output a plurality of pieces of information about the object whose sense of quality has been controlled by the sense-of-quality control unit.

The image processing apparatus can further include a function information acquisition unit that acquires function information of the plurality of output units, in which the sense-of-quality control unit controls the sense of quality of the object in the image by using the physical characteristic parameter and the function information acquired by the function information acquisition unit.

The plurality of output units are constituted by display units of a same type that output images about the object.

The plurality of output units output the images about the object at a same pixel position.

The plurality of output units are constituted by at least one display unit that outputs an image about the object, and an output unit that outputs information other than the image about the object.

The physical characteristic parameter can be reflection characteristic information indicating a reflection characteristic of the object, and the output unit can output the reflection characteristic of the object.

One output unit can output a specular reflection component of the reflection characteristic of the object, and another output unit can output a diffuse reflection component of the reflection characteristic of the object.

The one output unit can output the specular reflection component of the reflection characteristic of the object to a front, and the other output unit can output the diffuse reflection component of the reflection characteristic of the object to a back.

The one output unit can be a device having a high peak luminance, and the other output unit can be a device having a low peak luminance.

The physical characteristic parameter can be a wavelength of the object, and the output unit can perform output with respect to a wavelength of the object.

The one output unit can be an electronic paper and outputs an object color of the wavelength of the object, and the other output unit can be an LCD (liquid crystal display) and outputs a light source color of the wavelength of the object.

The physical characteristic parameter can be a frequency component of the object, and the output unit can perform output with respect to the frequency component of the object.

The physical characteristic parameter can be the frequency component of the object, and the output unit can perform output with respect to a texture of the frequency component of the object.

The one output unit can be a tactile display and outputs the texture of the frequency component of the object, and the other output unit can be an LCD (liquid crystal display) and outputs a structure of the frequency component of the object.

The physical characteristic parameter can be a depth or deepness of the object, and the output unit can perform output with respect to the depth or deepness of the object.

The physical characteristic parameter can be information on a time direction of the object, and the output unit can perform output with respect to a mobile object and a stationary object in the time direction of the object.

An image processing method according to an aspect of the present disclosure includes: by an image processing apparatus, acquiring a physical characteristic parameter regarding an object of an image; controlling a sense of quality of the object in the image by using the acquired physical characteristic parameter; and respectively outputting a plurality of pieces of information about the object whose sense of quality has been controlled, to a plurality of display units.

In an aspect of the present disclosure, a physical characteristic parameter regarding an object of an image is acquired and a sense of quality of the object in the image is controlled by using the acquired physical characteristic parameter. Then, a plurality of pieces of information about the object whose sense of quality has been controlled are respectively output to a plurality of display units.

Advantageous Effects of Invention

In accordance with an aspect of the present disclosure, images can be processed. In particular, it is possible to more favorably reproduce a sense of quality as if there were a real object.

Note that the effects described in the present specification are merely illustrative, the effects of the present technology are not limited to the effects described in the present specification, and additional effects may be provided.

BRIEF DESCRIPTION OF DRAWINGS

FIGS. 5A, 5B and 5C Diagrams showing an example of a display system.

FIG. 6 A diagram describing an example of processing of the present technology.

FIG. 7 A diagram describing another example of the processing of the present technology.

MODE(S) FOR CARRYING OUT THE INVENTION

Hereinafter, modes for carrying out the present disclosure (hereinafter, referred to as embodiments) will be described. Note that descriptions will be made in the following order.
1. Outline of Present Technology
2. Configuration Example
3. Embodiment
4. Processing Example
5. Configuration Example of Computer 1. Outline of Present Technology

[Concept of Present Technology]

Figure 1:
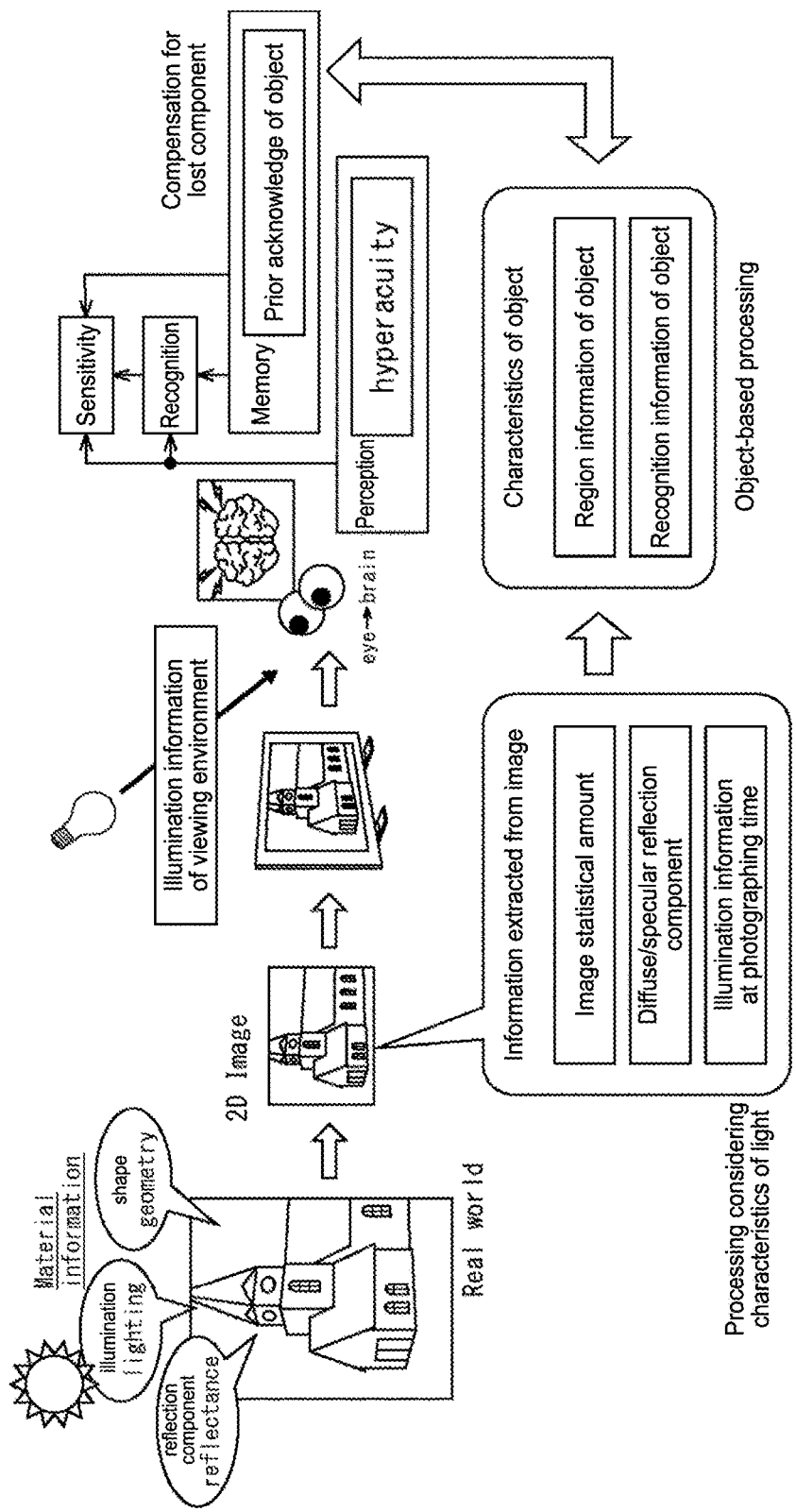
FIG. 1 A diagram describing a concept of the present technology.

A concept of the present technology will be described with reference to FIG. 1. The present technology is for improving a sense of quality of an object in an image.

In the real world, those that a person feels with eyes, that is, physical information (material information) indicating how light enters the eyes is fundamentally necessary information. This physical information is, for example, solar light (illumination: lighting), a shape (geometry) of an object, a reflection component (reflectance) of the object, and the like. With this physical information, light can be theoretically reproduced.

This physical information enters sensors of a camera. Therefore, this physical information can be estimated and acquired as characteristic information of the object (region information and recognition information of the object) on the basis of information (image statistical amount, diffuse/specular reflection component, illumination information at photographing time) extracted from an image (2D image).

Note that processing of extracting information from an image is processing considering characteristics of light and processing of estimating it as the characteristic information of the object is object-based processing.

Therefore, in the present technology, information extracted from an image is utilized as the characteristic information of the object to control the sense of quality of (a surface of) the object in the image. Further, it is also possible to utilize physical information, which is measured and acquired from the real world, in such control.

In addition, the sense of quality of the object in the image is associated with not only this physical information but also, actually, information on an environment in which viewing is performed (illumination information of viewing environment) and information indicating how a person feels (perception: hyperacuity). Therefore, in the present technology, the sense of quality of the object in the image is controlled and an image is remade by not only utilizing this physical information but also utilizing the information on the environment in which viewing is performed (illumination information of viewing environment) and the information indicating how the person feels.

In this manner, in the present technology, the sense of quality of the object in the image is controlled. Here, in the present specification, the sense of quality refers to psychological feelings (psychological factors) of a person, which is caused with respect to properties (physical factors) of a material.

That is, in the present specification, the sense of quality is defined as one including parameters representing physical characteristics of the object that are the physical factors and parameters representing cognitive sensitivity to the object that are the psychological factors.

Therefore, the sense-of-quality control in the present specification means control on the parameters of those physical factors and psychological factors. Note that, although the description "physical characteristic parameters that are the parameters of the physical factors are controlled in the sense-of-quality control" will be merely made hereinafter, the parameters representing the cognitive sensitivity to the object that are the parameters of the psychological factors are actually controlled also in such a case.

In addition, in the present technology, corresponding not only to an image output but also to various output devices, the sense-of-quality control is performed not only on an output image but also on additional information associated with the output image by analyzing information on the output devices.

With this, the result of analyzing the characteristic information of the object can be output as information other than the image. Therefore, more realistic visual expression becomes possible.

Further, in the present technology, corresponding to the plurality of output devices, the sense-of-quality control is also performed on a plurality of output images having different features by analyzing the information on the output device.

With this, it is compatible with various displays such as a light-field display and a hybrid display like a DFD (Depth-fused Display). Therefore, more realistic visual expression becomes possible.

Note that, by inputting these output image and additional information into an output device, it becomes possible to use the additional information for device control.

Further, information on user's operations performed during display of the image, line-of-sight information, and viewing information are operation information regarding user's operations performed during display of the image. Therefore, hereinafter, they will also be collectively referred to as user operation information.

[Sense-of-Quality Control Method According to Present Technology]

Next, a sense-of-quality control method according to the present technology will be described with reference to FIG. 2.

First of all, an object of the real world is photographed and an image of the object is input into a measurement and estimation block 1. In the measurement and estimation block 1, physical characteristic parameters indicating the physical characteristics of the object are measured and acquired from the real world at the photographing time of the object. Alternatively, in the measurement and estimation block 1, the physical characteristic parameters indicating the physical characteristics of the object are estimated and acquired from the input image of the object. For example, the above-mentioned illumination and structure and reflection characteristic of the object are acquired as the physical characteristic parameters.

The acquired physical characteristic parameters of the object are modeled in a real-world modeling block 2. The modeled physical characteristic parameters of the object are input into a sense-of-quality control block 3.

In the sense-of-quality control block 3, the sense of quality of the object in the image is controlled in a manner that depends on the modeled physical characteristic parameters of the object and an amount of feature (texture) obtained from the image. As an example of the sense-of-quality control, the physical characteristic parameters are changed to make reflection easy, for example. With this, the optical characteristics of the object are optimized. Further, for example, if there is a portion insufficient in texture, it is suitably recovered. That is, in the sense-of-quality control block 3, as the sense-of-quality control, the physical characteristic parameters related to the shininess and the transparency of the appearance are changed (controlled) to increase them.

Further, in the sense-of-quality control block 3, the user operation information regarding user's operations performed during display of the image (e.g., operation information, line-of-sight information, and viewing information) is acquired and analyzed and used for sense-of-quality control thereof. In addition, information on an output device other than the image output and a plurality of image output devices having different features is analyzed and used for sense-of-quality control.

In a rendering and retouch block 4, the image is recomposed (rendered) and one or more images that are the result of finely adjusting the image quality are output (the number of images depends on the number of image output devices) in order to reconfigure the image in accordance with the result (changed parameters) of controlling the sense of quality. Further, in accordance with the sense-of-quality control, the additional information that is the information other than the image, which is associated with the image, is generated. In accordance with the generated additional information, it is output to the output device other than the image output.

By the above-mentioned processing, in accordance with the present technology, optimization of illumination light, enhancement of the shininess, or reproduction of the transparency in the image, for example, are performed if the input image is different from the actual appearance. That is, a situation when the object is actually seen can be visually reproduced.

Further, in accordance with the present technology, the image quality and the display method are changed in a manner that depends on the user operation information (user's interaction). Therefore, feelings other than the appearance such as the sense of touch of the object can also be given.

In addition, in accordance with the present technology, corresponding not only to the image output but also to various output devices, the information on the output devices is analyzed, and the sense-of-quality control is performed not only on the output image but also on the additional information associated with the output image. Further, in accordance with the present technology, the sense-of-quality control is performed not only on one image output but also on a plurality of image outputs having different features. With this, more realistic visual expression becomes possible.

2. Configuration Example of Apparatus

[Configuration Example of Image Processing Apparatus]

Figure 3:
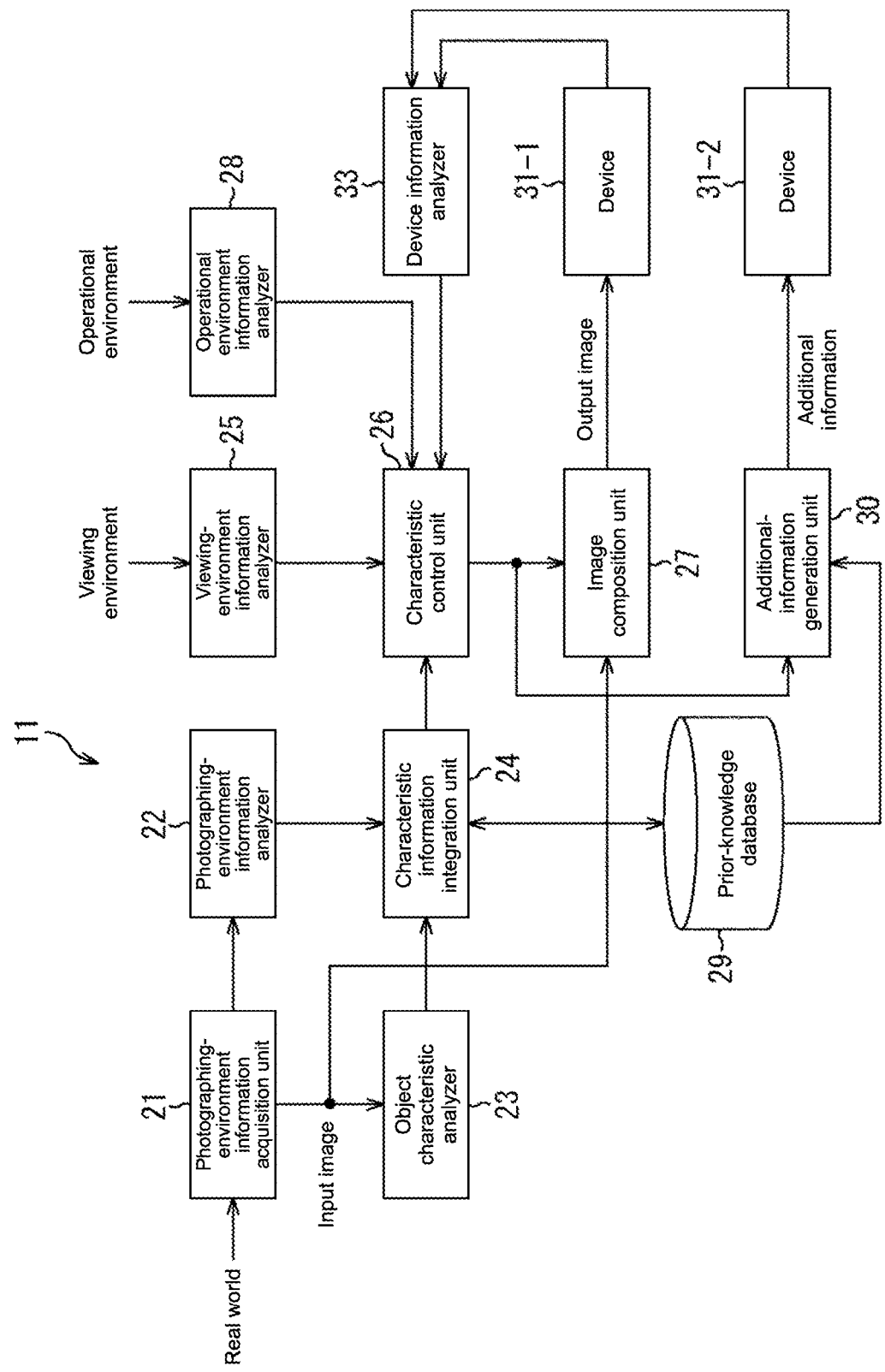
FIG. 3 A block diagram showing a main configuration example of an image processing apparatus.

FIG. 3 is a block diagram showing a configuration of an embodiment of an image processing apparatus to which the present disclosure is applied.

An image processing apparatus 11 shown in FIG. 3 acquires physical characteristic parameters regarding an object in an image input after the object of the real world is photographed as described above, and acquires operation information of a user (viewer). Further, the image processing apparatus 11 includes not only an image output but also various output devices. The image processing apparatus 11 also analyzes information on those output devices, controls the sense of quality of the object in the image in a manner that depends on the physical characteristic parameters and the operation information and the analysis results of those output devices, and outputs the image whose sense of quality of the object has been controlled and the additional information associated with the image.

The image processing apparatus 11 is configured to include a photographing-environment information acquisition unit 21, a photographing-environment information analyzer 22, an object characteristic analyzer 23, a characteristic information integration unit 24, a viewing-environment information analyzer 25, a characteristic control unit 26, an image composition unit 27, and an operational environment information analyzer 28. In addition, the image processing apparatus 11 is configured to include a prior-knowledge database 29, an additional-information generation unit 30, a device 31-1, a device 31-2, and a device information analyzer 33.

Figure 2:
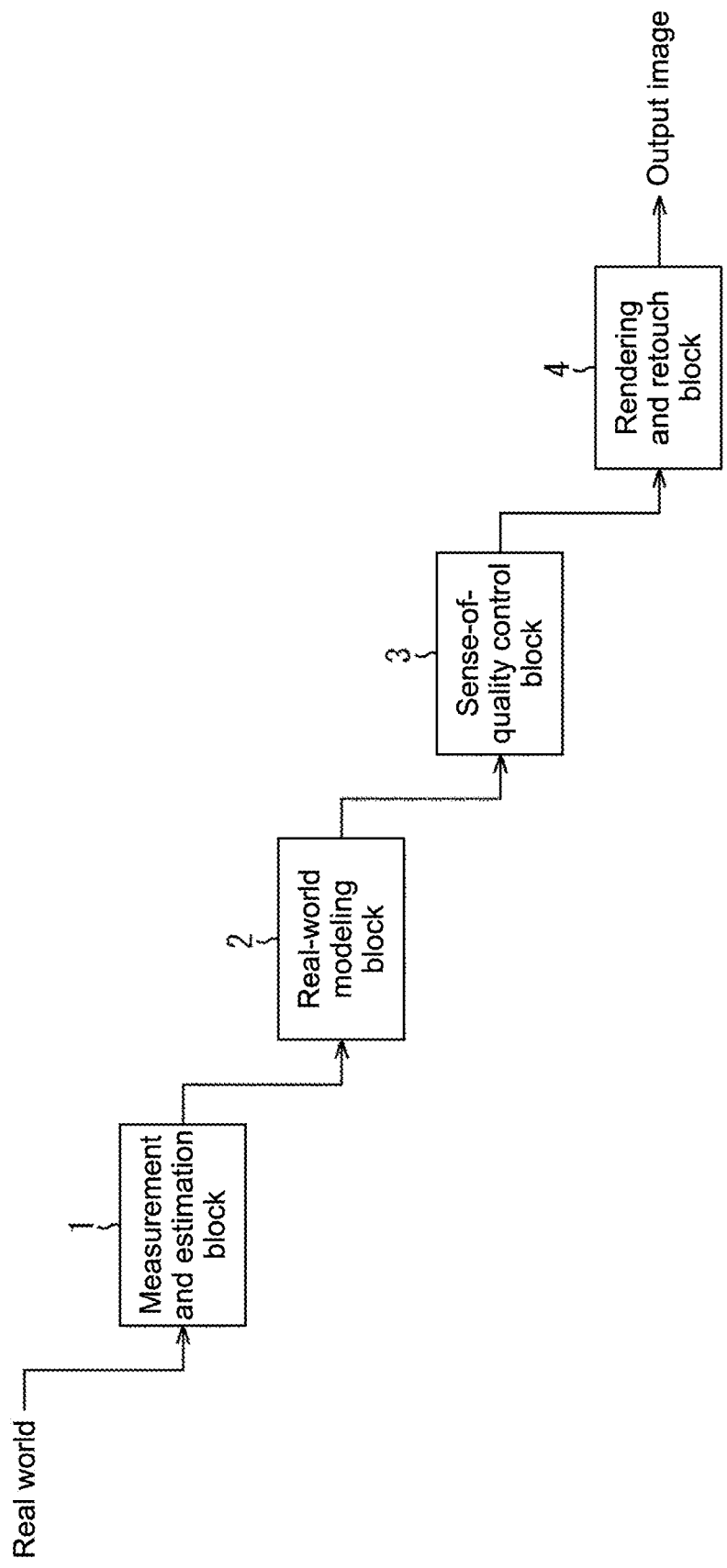
FIG. 2 A diagram describing a sense-of-quality control method according to the present technology.

The photographing-environment information acquisition unit 21, the photographing-environment information analyzer 22, and the object characteristic analyzer 23 correspond to the measurement and estimation block 1 of FIG. 2. The characteristic information integration unit 24 corresponds to the real-world modeling block 2 of FIG. 2. The characteristic control unit 26 corresponds to the sense-of-quality control block 3 of FIG. 2. The image composition unit 27 corresponds to the rendering and retouch block 4.

The photographing-environment information acquisition unit 21 takes an image of an object, inputs the image of the object, and supplies the input image, which has been input, to the object characteristic analyzer 23 and the image composition unit 27. Further, the photographing-environment information acquisition unit 21 acquires photographing-time information on the environment and the object at the photographing time of the image of the object and supplies the acquired photographing-time information to the photographing-environment information analyzer 22.

The photographing-environment information analyzer 22 analyzes the photographing-time information acquired at the photographing time from the photographing-environment information acquisition unit 21. The photographing-environment information analyzer 22 supplies the analyzed photographing-time information to the characteristic information integration unit 24.

The object characteristic analyzer 23 estimates and analyzes characteristics of the object on the basis of the input image from the photographing-environment information acquisition unit 21. The object characteristic analyzer 23 supplies the analyzed image estimation information to the characteristic information integration unit 24. In the object characteristic analyzer 23, information on details (e.g., portions having high sampling rate) that could not be acquired at the photographing time as the photographing-time information can be acquired by estimating it on the basis of the image.

The characteristic information integration unit 24 integrates the photographing-time information from the photographing-environment information analyzer 22 and the image estimation information from the object characteristic analyzer 23. The characteristic information integration unit 24 supplies it to the characteristic control unit 26 and the prior-knowledge database 29 as the physical characteristic parameter regarding the object.

The viewing-environment information analyzer 25 acquires and analyzes information on a viewing environment that is an environment in viewing an image (viewing-environment information). The viewing-environment information analyzer 25 supplies the analyzed viewing-environment information to the characteristic control unit 26 as a viewing-environment parameter.

The characteristic control unit 26 uses the physical characteristic parameters regarding the object from the characteristic information integration unit 24, the viewing-environment parameter from the viewing-environment information analyzer 25, operational environment parameter from the operational environment information analyzer 28, and device information from the device information analyzer 33, as control parameters. Specifically, for example, the characteristic control unit 26 determines processing contents for controlling the sense of quality, for example, changing the image quality, adjusting the reflection characteristic, or changing the shape, on the basis of the physical characteristic parameters and the device information. The characteristic control unit 26 supplies information on the determined processing contents to the image composition unit 27 and the additional-information generation unit 30 and causes the image composition unit 27 and the additional-information generation unit 30 to perform the sense-of-quality control. Further, the characteristic control unit 26 causes the image composition unit 27 and to perform the sense-of-quality control in a manner that depends on the viewing-environment parameter, the operational environment parameter, and the device information for optimizing the sense-of-quality control. That is, in the image processing apparatus 11, more realistic visual expression becomes possible due to an additional output other than the image from the device 31-2 besides the image output of the device 31-1.

Under the control of the characteristic control unit 26, the image composition unit 27 recomposes (renders) and adjusts the input image from the photographing-environment information acquisition unit 21 and outputs a recomposition result to the device 31-1 as the output image.

The operational environment information analyzer 28 acquires and analyzes the operational environment information of the user with respect to the image, which is performed during display of the image.

Note that examples of the operational environment information can include line-of-sight information of the viewer, operation information using an operation unit such as a touch panel and a mouse, sensor information given to the display, and viewing time information of the user. Examples of the line-of-sight information of the viewer can include information on position and range of a gazed region and information on the number of eye blinks. Examples of the operation information can include information on a touch position, a pointer position, a flick range, how to move arms which is obtained by gesture recognition, and the like. Examples of the sensor information can include information on a tilt of the display and a moving speed thereof.

The operational environment information analyzer 28 supplies the analyzed operational environment information to the characteristic control unit 26 as the operational environment parameter.

The prior-knowledge database 29 retains material information of the object, such as a jewel, a metal portion, water, leather, and the information other than the image, which regards size, hardness, and the like of the object. For example, in the prior-knowledge database 29, on the basis of the physical characteristic parameters regarding the object supplied from the characteristic information integration unit 24, the desk, jewel, metal, or the like is searched for and a sense of touch, sound information, and the like of the searched desk, jewel, or metal are supplied to the additional-information generation unit 30. That is, the information of this prior-knowledge database 29 is used, for example if the information on the device is not acquired in the device information analyzer 33 or if the information on the device is not analyzed in generating the additional information.

The additional-information generation unit 30 generates, on the basis of information on the determined processing contents (sense-of-quality control), additional information that is, for example, additional information of sound, vibration, a sense of touch, and the like of the object of the image and is for controlling the device 31-2. The additional-information generation unit 30 supplies the generated additional information to the device 31-2. That is, the additional-information generation unit 30 outputs the result of analyzing the characteristic information of the object as additional information other than the image. Examples of the additional information can include sound and sense-of-touch information expressing the sense of quality of the object, information on the specular reflection component, gamma characteristic information, and color information.

The device 31-1 is, for example, constituted by an LCD (liquid crystal display) and the like and displays the output image from the image composition unit 27. Further, the device 31-1 is, for example, an LCD itself and supplies information on a function and a performance as a device for displaying an image, for example, to the device information analyzer 33.

The device 31-2 is constituted by a device that outputs additional information that is additional information such as sound, vibration, and a sense of touch regarding the object of the image, other than the image. For example, the device 31-2 is constituted by a speaker that outputs sound and a device that is stacked on the device 31-1 and provides the user with a sense of touch by outputting the air, vibration, temperature, or the like in a user's touch operation.

The device information analyzer 33 acquires and analyzes information on the performance and the function of the devices from the device 31-1 and the device 31-2. The device information analyzer 33 supplies the analyzed information of the devices to the characteristic control unit 26.

Note that the control parameters are constituted by physical characteristic parameters regarding the object in which the photographing-time information from the photographing-environment information analyzer 22 and the image estimation information from the object characteristic analyzer 23 are integrated and the viewing-environment parameter from the viewing-environment information analyzer 25.

The physical characteristic parameters regarding the object is configured to include deepness and shape information of the object, illumination information at the photographing time, material information of the object, and reflection characteristic information of the object. Note that the illumination information at the photographing time also influences the color and the like of the object, and it can be said that it is information associated with the object or associated with the background of the object. Therefore, it is included in the physical characteristic parameters regarding the object.

The viewing-environment parameter is configured to include viewing-environment light information.

[Another Configuration Example of Image Processing Apparatus]

Figure 4:
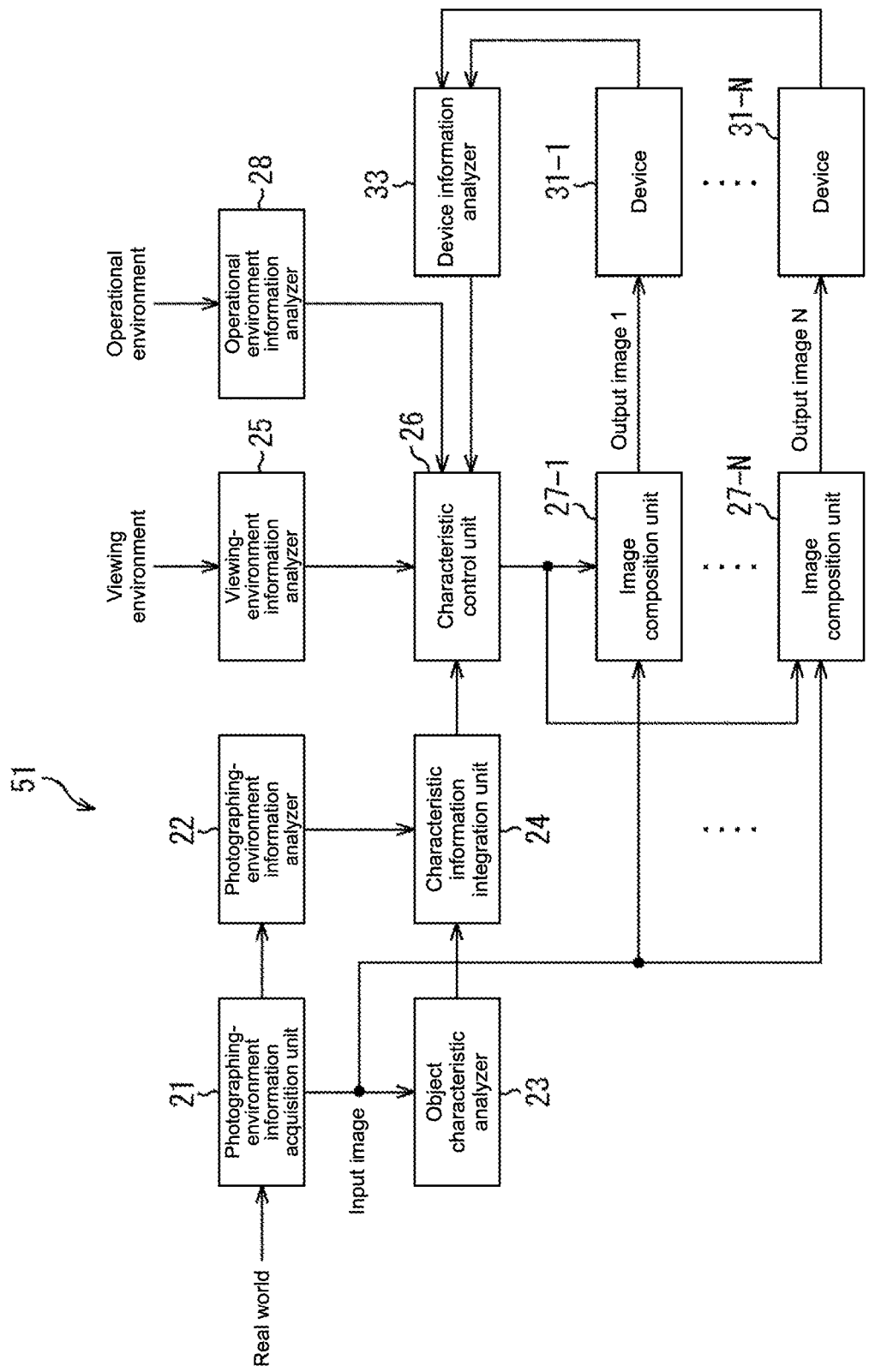
FIG. 4 A block diagram showing another configuration example of the image processing apparatus.

FIG. 4 shows another configuration of the embodiment of the image processing apparatus to which the present disclosure is applied. In the example of FIG. 4, an image processing apparatus 51 controls the sense of quality of the object in the image not only with respect to one image output but also with respect to a plurality of image outputs having different features and outputs the image whose sense of quality of the object has been controlled. Therefore, the input image is not limited to a single image and multi-viewpoint images may be input as the input images.

The image processing apparatus 51 shown in FIG. 4 is common to the image processing apparatus 11 of FIG. 3 in that it includes the photographing-environment information acquisition unit 21, the photographing-environment information analyzer 22, the object characteristic analyzer 23, the characteristic information integration unit 24, the viewing-environment information analyzer 25, the characteristic control unit 26, and the device information analyzer 33.

The image processing apparatus 51 is different from the image processing apparatus 11 of FIG. 3 in that the prior-knowledge database 29 and the additional-information generation unit 30 are excluded and the image composition units 27-1 to 27-2 and the devices 31-1 to 31-2 are changed into image composition units 27-1 to 27-N and devices 31-1 to 31-N (N>1).

That is, the devices 31-1 to 31-N are, for example, constituted by respective displays (or pixels) constituting a display system such as a hybrid display of a DFD (Depth-fused Display: multi-layer display) shown in FIG. 5A, multiple projectors shown in FIG. 5B, a light-field display shown in FIG. 5C, or the like. Note that the devices 31-1 to 31-N may be devices of the same type or may be devices of different types.

The multi-layer display includes displays in the front and rear as shown in FIG. 5A. As fusion in a deepness direction, a 3D image can be perceived by displaying objects arranged in a mutually overlapping manner in the front and rear. Further, as continuous deepness expression, it is possible to perceive a high-luminance object in the front as if it were positioned on a front side and a low-luminance object in the front as if it were positioned on a deep side, by displaying, in the front, objects whose luminance ratio is changed at three steps from dark to bright and displaying, in the rear, objects whose luminance ratio is changed at three steps from bright to dark in the entire screen in an overlapping manner.

In the multiple projectors, as shown in FIG. 5B, a plurality of projectors project light onto a single display surface. It is sensed with a camera or the like. The sensed information is subjected to analysis & signal processing and fed back to each projector. A video is thus adjusted.

The light field refers to a method of handling all rays present in a space. It considers even directions in which rays travel. A normal camera obtains ray intensity in a two-dimensional plane. On the other hand, a camera adapted for the light field is capable of four-dimensionally (in principle, five-dimensionally) storing even in which directions rays have passed at a certain position. The light-field display is a display capable of controlling (reproducing and realizing) the "directions of rays".

For example, in a case of the light-field display, ray information as well as luminance information differ between respective displays (or pixels) constituting the light-field display. For example, in a case of the DFD, the deepness information as well as the luminance information differ between respective displays constituting the DFD.

Therefore, the characteristic control unit 26 determines the processing contents of each display for controlling the sense of quality as the display system on the basis of the physical characteristic parameters from the characteristic information integration unit 24, information (e.g., position information, deepness information, and ray information) from each of the devices 31-1 to 31-N from the device information analyzer 33, and the like. Then, the characteristic control unit 26 causes the image composition units 27-1 to 27-N to perform the determined sense-of-quality control.

Under the control of the characteristic control unit 26, the image composition units 27-1 to 27-N recompose (render) and adjust the input image from the photographing-environment information acquisition unit 21 and respectively output the recomposition result to the respectively corresponding devices 31-1 to 31-N as the output image.

The devices 31-1 to 31-N are constituted by respective displays constituting a display system such as a hybrid display like a DFD (Depth-fused Display), representing the example described above with reference to FIGS. 5A, 5B and 5C, for example. The devices 31-1 to 31-N display the output images from the corresponding image composition units 27-1 to 27-N. Further, the devices 31, for example, supply individual device information such as their own function and performance information, position information, ray information, and direction information, deepness information to the device information analyzer 33.

The device information analyzer 33 analyzes device information from the devices 31-1 to 31-N and supplies to the characteristic control unit 26.

3. Embodiment

Next, a processing example in the image processing apparatus 51 will be described with reference to FIG. 6. In the example of FIG. 6, as the processing example, output targets, a plurality of information outputs output from the output targets, and effects corresponding thereto are shown.

For example, if the output target (devices 31-1 to 31-N) is a multi-layer display, the plurality of information outputs can be classified into an image of an object on a front side and an image of an object on a deep side. As an effect thereof, emphasis of the stereoscopic sense can be obtained. Further, the plurality of information outputs can be classified into outputs of a diffuse reflection component and a specular reflection component. As an effect thereof, the shininess utilizing a dynamic range can be enhanced. Further, the plurality of information outputs can be classified into an object side and a light source color. As an effect thereof, a reduction in power consumption can be achieved by displaying an invariable object color on the electronic paper and displaying a difference on the LCD.

If the output target is multiple projectors, the plurality of information outputs can be classified into the diffuse reflection component and the specular reflection component. As an effect thereof, an improvement in the shininess utilizing the dynamic range can be achieved.

If the output target is an LCD or an OLED (organic electroluminescence), the plurality of information outputs can be classified into the diffuse reflection component and the specular reflection component. As an effect thereof, power consumption can be reduced and screen burn-in can be prevented while keeping visibility due to lowing of the specular reflection component.

If the output target is a tactile display, the plurality of information outputs can be classified into a structure component and a texture component. As an effect thereof, the sense of touch utilizing the texture component can be reproduced.

If the output target is video+audio, the plurality of information outputs can be classified into a video and audio corresponding to a material. As an effect thereof, audio corresponding to the object can be output. The plurality of information outputs can be classified into luminance information and color information (wavelength). Further, it can be classified into being focused and being unfocused and can be classified into a high-frequency component and a low-frequency component.

Figure 7:
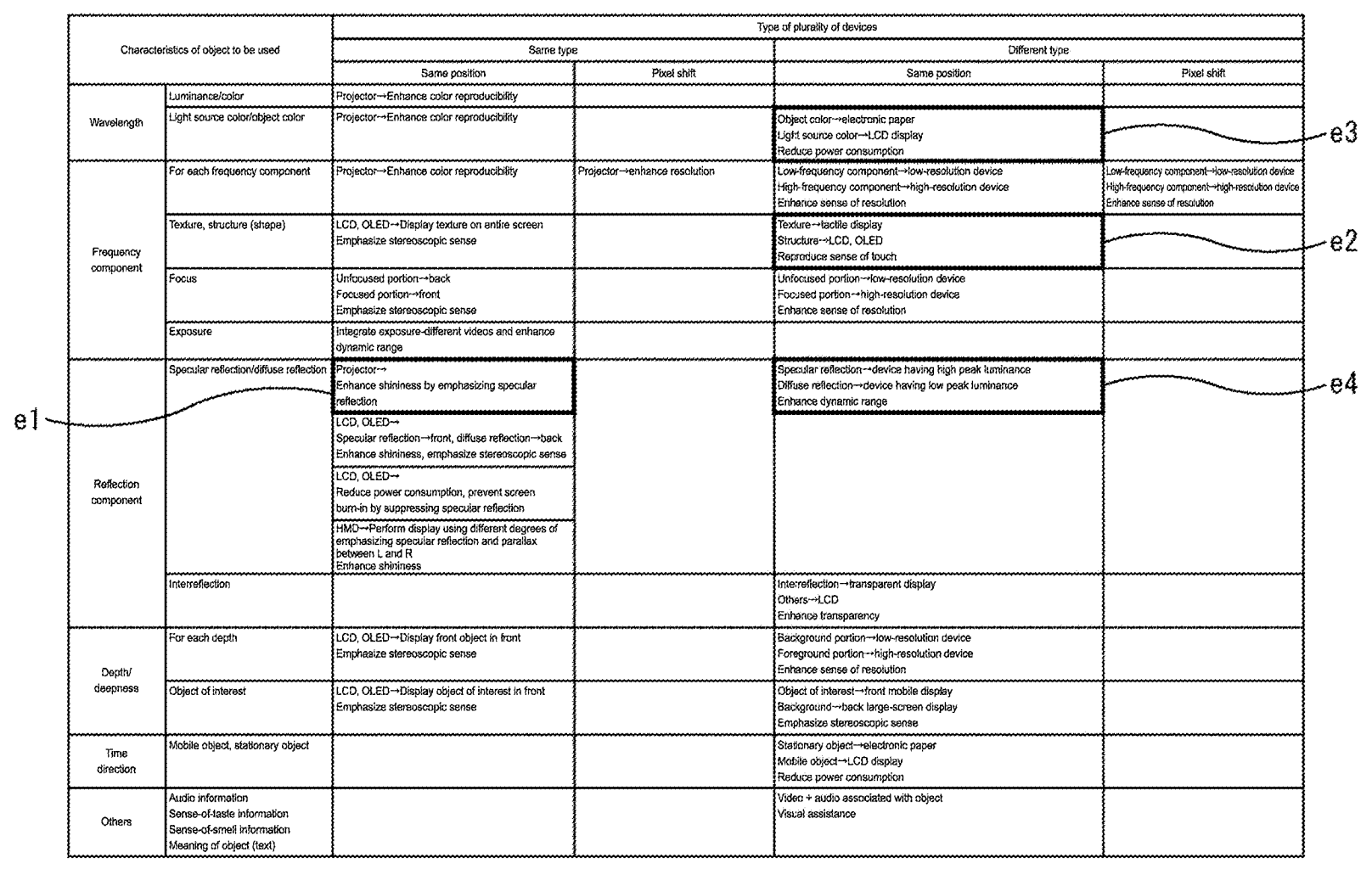

Further, FIG. 7 is a diagram describing another processing example. In the example of FIG. 7, as the processing example, characteristics of an object to be used, types of a plurality of devices (devices 31-1 to 31-N) (same type or different types) and positions of pixels thereof (same position or pixel shift), and effects thereof are shown.

As the characteristic of the object, luminance/color of the wavelength is used in the plurality of projectors at the same position (i.e., same type). The effect of enhancing the color reproducibility can be thus obtained.

As the characteristic of the object, the light source color/object color of the wavelength is used in the plurality of projectors at the same position (i.e., same type). The effect of enhancing the color reproducibility can be thus obtained. Further, the light source color/object color of the wavelength is utilized as the characteristic of the object, and the object color is displayed on the electronic paper and the light source color is displayed on the LCD at the same position. The effect of reducing the power consumption can be thus obtained. Note that details of this processing example will be described later with reference to FIG. 16 as a processing example e3.

As the characteristic of the object, the frequency component is used in the plurality of projectors (of the same type) at the same position for each frequency component. The effect of enhancing the color reproduction can be thus obtained. The effect of enhancing the resolution can be obtained by using the frequency component as the characteristic of the object for each frequency component in a plurality of pixel-shift projectors (of the same type).

As the characteristic of the object, for each frequency component, a low frequency is used in a low-resolution device and a high frequency is used in a high-resolution device at the same position or with pixel shift. The effect of enhancing the sense of resolution can be thus obtained.

As the characteristic of the object, the texture, structure (shape) of the frequency component is utilized, and the texture is displayed on the entire surface in the LCD or OLED of the same type at the same position. The effect of emphasizing the stereoscopic sense can be thus obtained. Further, the sense of touch can be reproduced by utilizing the texture, structure (shape) of the frequency component as the characteristic of the object and using the texture on the tactile display and the structure on the LCD or OLED at the same position. Note that details of this processing example will be described later with reference to FIG. 15 as a processing example e2.

As the characteristic of the object, the focus of the frequency component is utilized, and an unfocused portion is used in the back and a focused portion is used in the front at the same position. The effect of emphasizing the stereoscopic sense can be thus obtained.

As the characteristic of the object, the focus of the frequency component is utilized, and an unfocused portion is used in the low-resolution device and a focused portion is used in the high-resolution device at the same position. The effect of enhancing the sense of resolution can be thus obtained.

As the characteristic of the object, the exposure of the frequency component is utilized, and exposure-different videos are integrated in devices of the same type at the same position. The effect of enhancing the dynamic range can be thus obtained.

As the characteristic of the object, the specular reflection/diffuse reflection of the reflection component is used in the plurality of projectors (of the same type) at the same position. Due to the emphasis of the specular reflection, the effect of enhancing the shininess can be thus obtained. Note that details of this processing example will be described later with reference to FIG. 14 as a processing example e1.

As the characteristic of the object, the specular reflection of the reflection component is displayed in the front and the diffuse reflection displayed in the back at the same position. The effects of enhancing the shininess and emphasizing the stereoscopic sense can be obtained.

As the characteristic of the object, the specular reflection/diffuse reflection of the reflection component is utilized, and the specular reflection is suppressed in the LCD or OLED at the same position. The effects of reducing the power consumption and preventing screen burn-in can be thus obtained.

As the characteristic of the object, the specular reflection/diffuse reflection of the reflection component is utilized, and display is performed using different degrees of emphasizing the specular reflection and parallax between L and R of an HMD (head-mounted display) at the same position. The effect of enhancing the shininess can be thus obtained.

As the characteristic of the object, the specular reflection of the reflection component is displayed on a device having a high peak luminance and the diffuse reflection is displayed on a device having a low peak luminance at the same position. The effect of enhancing the dynamic range can be thus obtained. Note that details of this processing example will be described later with reference to FIG. 17 as a processing example e4.

As the characteristic of the object, interreflection of the reflection component is utilized, and the interreflection is displayed on a transparent display and the others are displayed on the LCD at the same position. The effect of enhancing the transparency can be thus obtained.

As the characteristic of the object, for each depth of the depth/deepness, the front object is displayed in the front in the LCD or OLED of the same type at the same position. The effect of emphasizing the stereoscopic sense can be thus obtained.

As the characteristic of the object, for each depth of the depth/deepness, a background portion is displayed in the low-resolution device and a foreground portion is displayed in the high-resolution device at the same position. The effect of enhancing the sense of resolution can be thus obtained.

As the characteristic of the object, the object of interest of the depth/deepness is utilized, and the object of interest is displayed in the front in the LCD or OLED of the same type at the same position. The effect of emphasizing the stereoscopic sense can be thus obtained.

As the characteristic of the object, the object of interest of the depth/deepness is utilized, and the object of interest is displayed on a front mobile display and the background is displayed on a large-screen display at the same position. The effect of emphasizing the stereoscopic sense can be thus obtained.

As the characteristic of the object, a mobile object and a stationary object in the time direction are utilized, and the stationary object is displayed on the electronic paper and the mobile object is displayed on the LCD at the same position. The effect of reducing the power consumption can be thus obtained.

As the characteristic of the object, other audio information, sense-of-taste information, sense-of-smell information, and meaning (text) are utilized, and a video is displayed on the display, audio associated with the object is displayed to the speaker and to a device that outputs visual assistance at the same position. More realistic visual expression can be thus realized.

4. Processing Example

[Example of Image Processing]

Next, image processing of will be described with reference to the flowchart of FIG. 8.

In Step S11, the photographing-environment information acquisition unit 21 takes an image of an object and inputs the image of the object. The photographing-environment information acquisition unit 21 supplies the input image, which has been input, to the object characteristic analyzer 23 and the image composition unit 27.

In Step S12, the photographing-environment information acquisition unit 21, the photographing-environment information analyzer 22, and the object characteristic analyzer 23 performs measurement/estimation/integration processing. Details of this measurement/estimation/integration processing will be described later with reference to FIG. 9. Through the processing of Step S12, the measured physical characteristic parameters and the estimated physical characteristic parameters (the reflection characteristic of the object, photographing-environment light, an object shape, and a material of the object, etc.) are supplied to the characteristic control unit 26.

In Step S13, the viewing-environment information analyzer 25 and the characteristic control unit 26 perform processing based on viewing-environment information that is information on an environment in viewing an image. Details of this processing based on the viewing-environment information will be described later with reference to FIG. 10. Through the processing of Step S13, the processing contents of the sense-of-quality control based on the viewing-environment information are determined.

In Step S14, the characteristic control unit 26 performs reflection characteristic adjustment processing based on the material of the object. This reflection characteristic adjustment processing will be described later with reference to FIG. 11. Note that, at this time, integrated physical characteristic parameters (material and reflection characteristic) is referred to by the characteristic information integration unit 24. Through the processing of Step S14, the processing contents of the sense-of-quality control based on the reflection characteristic are determined.

In Step S15, the operational environment information analyzer 28 and the characteristic control unit 26 perform processing based on line-of-sight information included in the user operation information. This processing based on the line-of-sight information will be described later with reference to FIG. 12. Through the processing of Step S15, the processing contents of the sense-of-quality control based on the line-of-sight information are determined.

In Step S16, the operational environment information analyzer 28 and the characteristic control unit 26 perform processing based on operation information included in the user operation information. The processing based on this operation information will be described later with reference to FIG. 13. Through the processing of Step S16, the processing contents of the sense-of-quality control based on the operation information are determined.

In Step S17, the characteristic control unit 26 and the device information analyzer 33 perform output control processing based on the device information. The output control processing based on this device information will be described later with reference to FIGS. 14 to 17.

Due to the output control of Step S17, the sense of quality is controlled in a manner that depends on the device information and the image of the object whose sense of quality has been controlled is output to the devices 31-1 to 31-N (N>1). Note that, in a case of the image processing apparatus 11 of FIG. 3, due to the output control of Step S17, the image of the object whose sense of quality has been controlled is output from the device 31-1 and the additional information associated with the image is output from the device 31-2.

As described above, all physical characteristic parameters obtained at the photographing time or from the image are used. Then, in addition, as long as these physical characteristic parameters are accurately acquired, optimization of illumination light, enhancement of the shininess, and reproduction of the transparency in the image are performed by changing them even if the reproducibility of the input image is poor. That is, a situation when the object is actually seen can be visually reproduced like CG (computer graphics).

In the above-mentioned manner, in the present technology, the video quality can be improved by measuring the physical characteristic parameters regarding the object (shape, reflection characteristic, illumination, etc.) and controlling the characteristics thereof.

Further, a plurality of images and information associated with the images can be output in a manner that depends on the device information. Therefore, it is possible to more favorably reproduce a sense of quality as if there were a real object. For example, the deepness sense and the like can be provided by the display of the DFD and the like or feelings other than the appearance, such as the sense of touch, can also be given.

Next, the measurement/estimation/integration processing of Step S12 of FIG. 8 will be described with reference to the flowchart of FIG. 9.

In Step S31, the photographing-environment information acquisition unit 21 measures photographing-environment light and supplies the measured photographing-environment light to the photographing-environment information analyzer 22. The photographing-environment information analyzer 22 analyzes the photographing-environment light from the photographing-environment information acquisition unit 21 and supplies the analyzed result, the information on the photographing-environment light to the characteristic information integration unit 24.

In Step S32, the photographing-environment information acquisition unit 21 measures a reflection characteristic of the object and supplies the measured reflection characteristic and material of the object to the photographing-environment information analyzer 22. The photographing-environment information analyzer 22 analyzes the reflection characteristic and material of the object from the photographing-environment information acquisition unit 21 and supplies the analyzed reflection characteristic and material of the object to the characteristic information integration unit 24.

In Step S33, the photographing-environment information acquisition unit 21 measures an object shape and supplies the measured object shape to the photographing-environment information analyzer 22. The photographing-environment information analyzer 22 analyzes the object shape from the photographing-environment information acquisition unit 21 and supplies the analyzed object shape to the characteristic information integration unit 24.

In Step S34, the object characteristic analyzer 23 estimates and analyzes photographing-environment light from the supplied input image and acquires the analyzed result, the information on the photographing-environment light. The object characteristic analyzer 23 supplies the information on the photographing-environment light to the characteristic information integration unit 24.

In Step S35, the characteristic information integration unit 24 integrates information on the measured photographing-environment light and information on the estimated photographing-environment light. The characteristic information integration unit 24 supplies the integrated information on the photographing-environment light to the characteristic control unit 26 as the physical characteristic parameter.

In Step S36, the characteristic control unit 26 causes the image composition unit 27 to adjust the white balance of the image with illumination color obtained from the information on the photographing-environment light.

In Step S37, the object characteristic analyzer 23 estimates and analyzes reflection characteristic and material of the object and supplies to the characteristic information integration unit 24 information on the analyzed reflection characteristic and material.

In Step S38, the characteristic information integration unit 24 integrates information on the measured reflection characteristic of the object and information on the estimated reflection characteristic of the object. The characteristic information integration unit 24 supplies the integrated information on the reflection characteristic of the object to the characteristic control unit 26 as the physical characteristic parameter.

In Step S39, the characteristic information integration unit 24 integrates information on the measured material of the object and information on the estimated material of the object. The characteristic information integration unit 24 supplies the integrated information on the material of the object to the characteristic control unit 26 as the physical characteristic parameter.

In Step S40, the object characteristic analyzer 23 estimates and analyzes a shape of the object and supplies information on the analyzed shape of the object to the characteristic information integration unit 24.

In Step S41, the characteristic information integration unit 24 integrates information on the measured shape of object and information on the estimated shape of the object. The characteristic information integration unit 24 supplies the integrated information on the shape of the object to the characteristic control unit 26 as the physical characteristic parameter.

In the above-mentioned manner, at the photographing time, the material of the object and the like as well as illumination light and the reflection characteristic and shape of the object that are the characteristics of the object are measured. Further, they are estimated on the basis of the input image and pieces of information thereon are integrated on the basis of reliability. The thus integrated physical characteristic parameters is used for sense-of-quality control. Therefore, optimization of illumination light, enhancement of the shininess, and reproduction of the transparency in the image are further improved.

Figure 10:
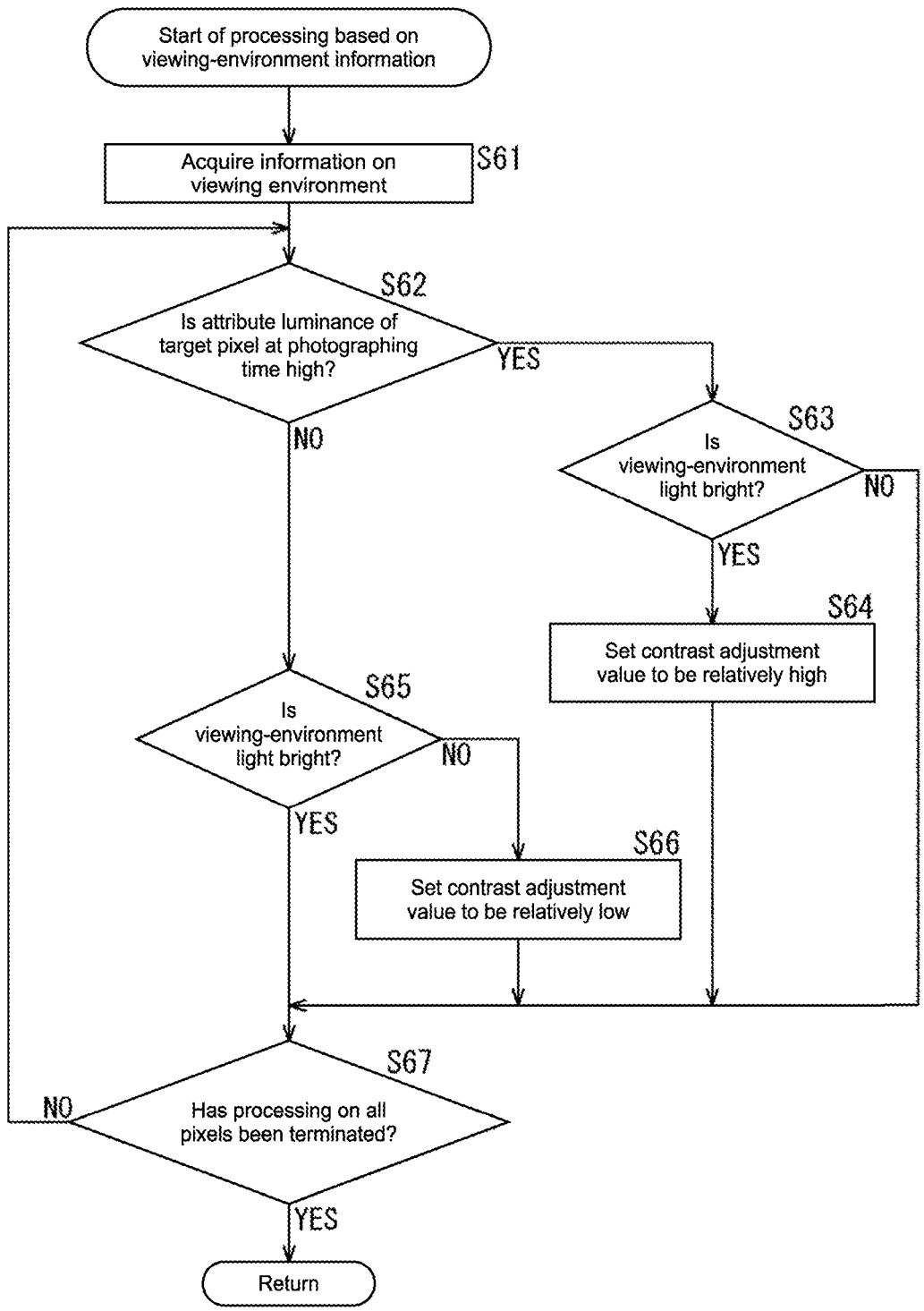
FIG. 10 A flowchart describing processing based on viewing-environment information.

Next, the processing based on the viewing-environment information of Step S13 of FIG. 8 will be described with reference to the flowchart of FIG. 10.

In Step S61, the viewing-environment information analyzer 25 acquires and analyzes information on viewing-environment light, for example, as information on a viewing environment that is an environment in viewing an image. The viewing-environment information analyzer 25 supplies information on the analyzed viewing-environment light to the characteristic control unit 26 as the viewing-environment parameter.

In the characteristic control unit 26, absolute-luminance information of the image at the photographing time is also estimated through the object characteristic analyzer 23 and supplied to the characteristic control unit 26. In Step S62, the characteristic control unit 26 determines whether or not an absolute luminance of a target pixel at the photographing time is higher than a predetermined luminance value. In Step S62, if it is determined that the absolute luminance of the target pixel at the photographing time is higher, the processing proceeds to Step S63.

In Step S63, the characteristic control unit 26 refers to the viewing-environment parameter from the viewing-environment information analyzer 25 and determines whether or not the viewing-environment light is bright above a predetermined value. In Step S63, if it is determined that the viewing-environment light is bright, the processing proceeds to Step S64. In this case, it may be looked dark. Therefore, in Step S64, the characteristic control unit 26 controls the image composition unit 27 and sets a contrast adjustment value to be relatively high as the sense-of-quality control.

In Step S63, if it is determined that the viewing-environment light is weak, Step S64 is skipped and the processing proceeds to Step S67.

In Step S62, if it is determined that the absolute luminance of the target pixel at the photographing time is lower, the processing proceeds to Step S65. In Step S65, the characteristic control unit 26 refers to the viewing-environment parameter from the viewing-environment information analyzer 25 and determines whether or not the viewing-environment light is bright above a predetermined value.

In Step S65, if it is determined that the viewing-environment light is weak, the processing proceeds to Step S66. In Step S66, the characteristic control unit 26 controls the image composition unit 27 to set the contrast adjustment value to be relatively low as the sense-of-quality control.

In Step S65, if it is determined that the viewing-environment light is bright, Step S66 is skipped and the processing proceeds to Step S67.

In Step S67, the characteristic control unit 26 determines whether or not the adjustment of the reflection characteristic with respect to all the pixels has been terminated.

In Step S67, if it is determined that the processing has been terminated with respect to all the pixels, the processing based on the viewing-environment information ends. In Step S67, if it is determined that the processing on all the pixels has not yet been terminated, the processing returns to Step S62 and the processing following this step is repeated.

As described above, the contrast and reflection characteristic of the image are adjusted on the basis of the viewing environment, and the sense of quality of the image of the object is controlled. With this, optimization of illumination light, the enhancement of the shininess, and the reproduction of the transparency in the image are performed.

Figure 11:
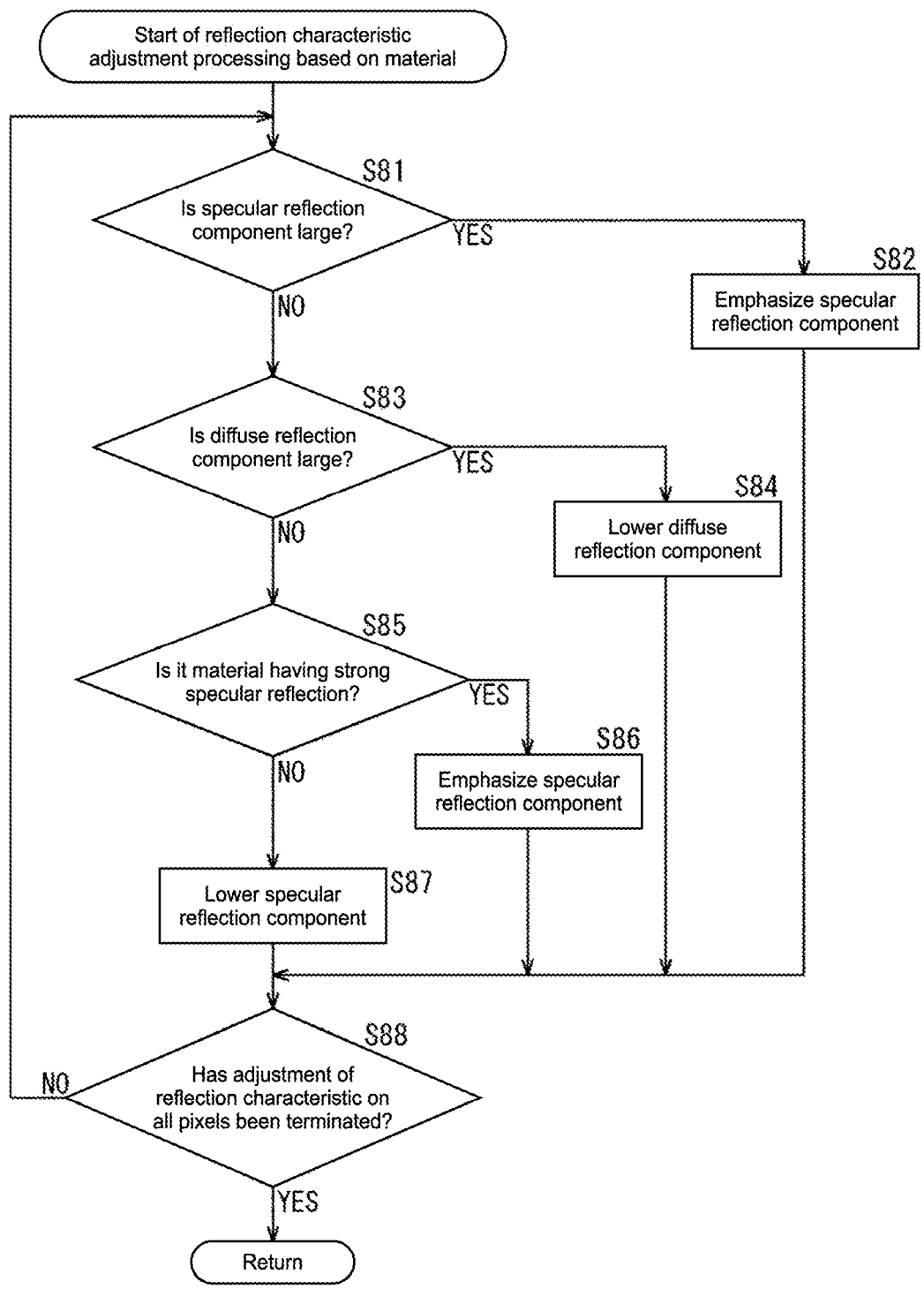
FIG. 11 A flowchart describing reflection characteristic adjustment processing based on a material of an object.

Next, the reflection characteristic adjustment processing based on the material in Step S14 of FIG. 8 will be described with reference to the flowchart of FIG. 11.

In Step S81, the characteristic control unit 26 determines whether or not the specular reflection component is large on the basis of the information on the reflection characteristic of the object from the characteristic information integration unit 24. In Step S81, if it is determined that the specular reflection component is large, the processing proceeds to Step S82.

In Step S82, the characteristic control unit 26 determines to emphasize the specular reflection component as the sense-of-quality control. In Step S81, if it is determined that the specular reflection component is small, the processing proceeds to Step S83.

In Step S83, the characteristic control unit 26 determines whether or not the diffuse reflection component is large. In Step S83, if it is determined that the diffuse reflection component is large, the processing proceeds to Step S84. In Step S84, the characteristic control unit 26 determines to lower the diffuse reflection component as the sense-of-quality control.

In Step S83, if it is determined that the diffuse reflection component is small, the processing proceeds to Step S85.

In Step S85, the characteristic control unit 26 determines whether or not it is the material having strong specular reflection on the basis of information on the material of the object which is integrated by the characteristic information integration unit 24. In Step S85, if it is determined that it is the material having strong specular reflection, the processing proceeds to Step S86. In Step S86, the characteristic control unit 26 determines to emphasize the specular reflection component as the sense-of-quality control.

In Step S85, if it is determined that it is not the material having strong specular reflection, the processing proceeds to Step S87. In Step S87, the characteristic control unit 26 determines to lower the specular reflection component as the sense-of-quality control.

In Step S88, the characteristic control unit 26 determines whether or not the adjustment of the reflection characteristic with respect to all the pixels has been terminated.

In Step S88, if it is determined that the adjustment of the reflection characteristic with respect to all the pixels has been terminated, the reflection characteristic adjustment processing ends. In Step S88, if it is determined that the adjustment of the reflection characteristic has not yet been terminated with respect to all the pixels, the processing returns to Step S81 and the processing following this step is repeated.

As described above, in a manner that depends on the material of the object, the reflection characteristic of the image is adjusted and the sense of quality of the image of the object is controlled. With this, optimization of illumination light, the enhancement of the shininess, and the reproduction of the transparency in the image are performed.

Figure 12:
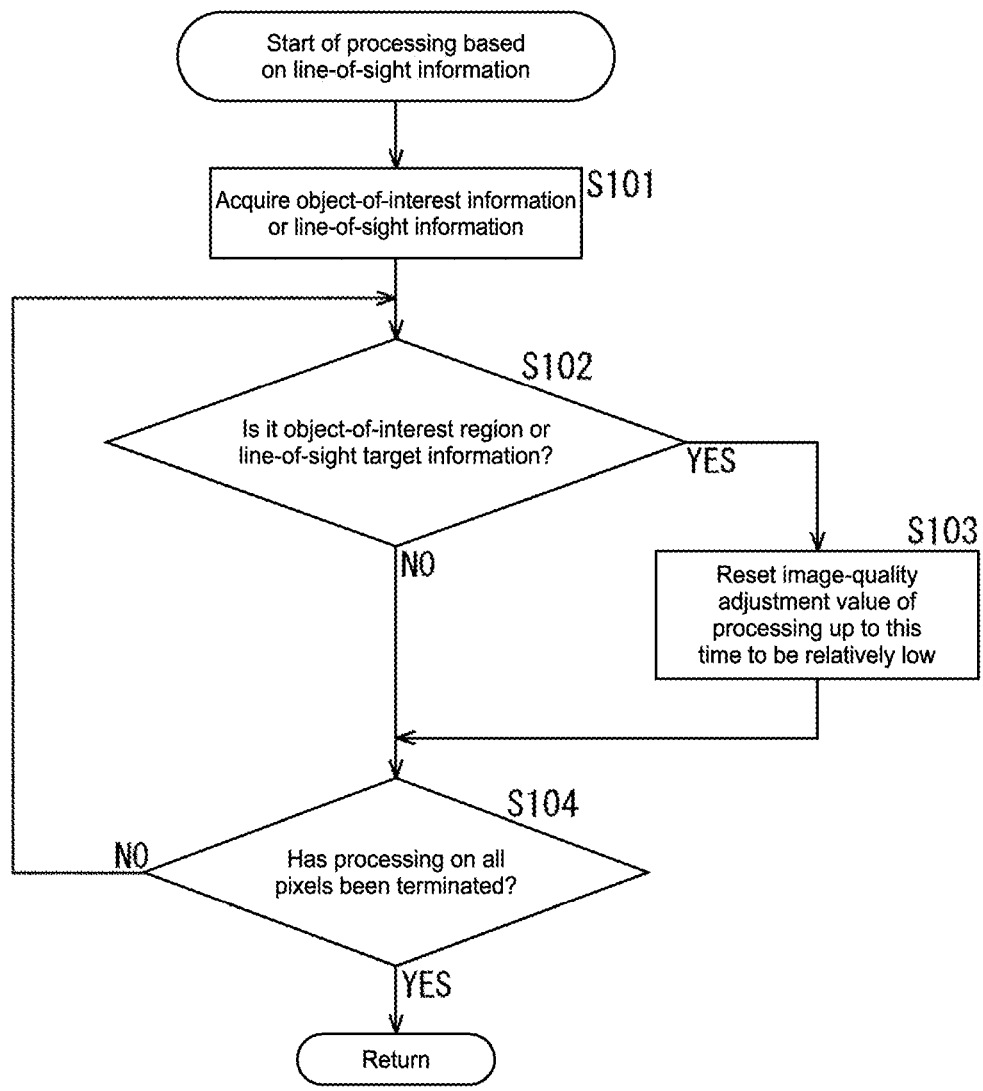
FIG. 12 A flowchart describing processing based on line-of-sight information.

Next, the processing based on the line-of-sight information in Step S15 of FIG. 8 will be described with reference to the flowchart of FIG. 12.

In Step S101, the operational environment information analyzer 28 acquires and analyzes, for example, object-of-interest information or line-of-sight information as the information on the operational environment. The operational environment information analyzer 28 supplies the information on the analyzed operational environment to the characteristic control unit 26 as the operational environment parameter.

In Step S102, the characteristic control unit 26 determines whether or not the target pixel is an object-of-interest region or a line-of-sight target region. In Step S102, if it is determined that it is the object-of-interest region or the line-of-sight target region, the processing proceeds to Step S103.

In Step S103, the characteristic control unit 26 controls the image composition unit 27 to set an image-quality adjustment value of the processing up to this time (i.e., processing based on the viewing-environment information, material), for example, to be relatively low as the sense-of-quality control.

In Step S102, if it is determined that the target pixel is not the object-of-interest region or the line-of-sight target region, Step S103 is skipped and the processing proceeds to Step S104.

In Step S104, the characteristic control unit 26 determines whether or not the processing has been terminated with respect to all the pixels.

In Step S104, if it is determined that the processing has been terminated with respect to all the pixels, the processing based on the line-of-sight information ends. In Step S104, if it is determined that the processing on all the pixels has not yet been terminated, the processing returns to Step S102 and the processing following this step is repeated.

As described above, the contrast and reflection characteristic of the image are adjusted on the basis of the viewing environment, and the sense of quality of the image of the object is controlled. With this, optimization of illumination light, the enhancement of the shininess, and the reproduction of the transparency in the image are performed.

Figure 13:
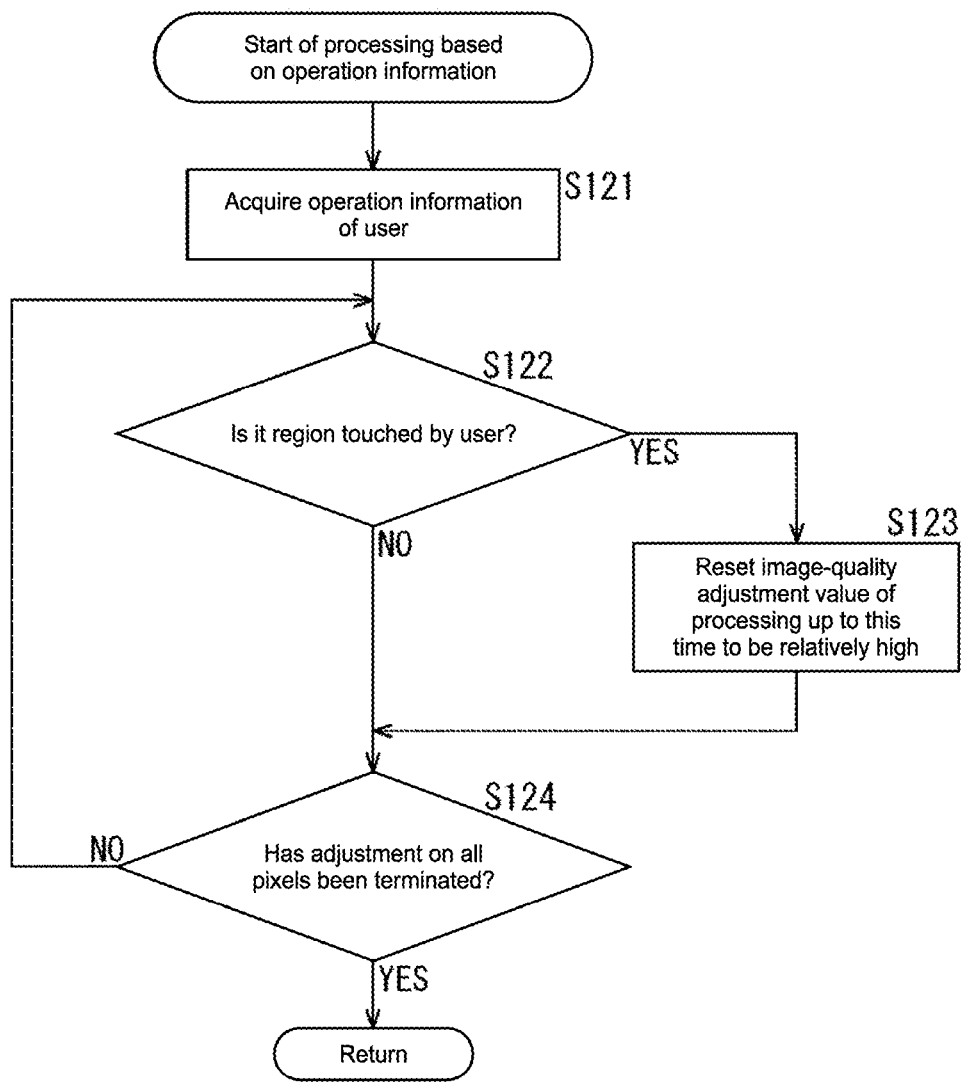
FIG. 13 A flowchart describing reflection characteristic adjustment processing based on operation information.

Next, the processing based on the operation information in Step S16 of FIG. 8 will be described with reference to the flowchart of FIG. 13.

In Step S121, the operational environment information analyzer 28 acquires and analyzes, for example, the operation information (flick, etc.) of the user as the information on the operational environment. The operational environment information analyzer 28 supplies the information on the analyzed operational environment to the characteristic control unit 26 as the operational environment parameter.

In Step S122, the characteristic control unit 26 determines whether or not the target pixel is a region touched by the user. In Step S122, if it is determined that it is the region touched by the user, the processing proceeds to Step S123.

In Step S123, the characteristic control unit 26 controls the image composition unit 27 to reset the image-quality adjustment value of the processing up to this time (i.e., processing based on viewing-environment information, reflection characteristic, line-of-sight information) to be relatively high as the sense-of-quality control.

In Step S122, if it is determined that the target pixel is not the region touched by the user, Step S123 is skipped and the processing proceeds to Step S124.

In Step S124, the characteristic control unit 26 determines whether or not the processing has been terminated with respect to all the pixels.

In Step S124, if it is determined that the processing has been terminated with respect to all the pixels, the processing based on the line-of-sight information ends. In Step S124, if it is determined that the processing on all the pixels has not yet been terminated, the processing returns to Step S122 and the processing following this step is repeated.

As described above, in a manner that depends on the information on the user's operation out of the operational environment, the reflection characteristic of the image is adjusted. With this, further optimization of illumination light, further enhancement of the shininess, and further reproduction of the transparency in the image are achieved. That is, it is possible to more favorably reproduce a sense of quality as if there were a real object.

Further, it is possible to provide high-order sense and the like other than the appearance, such as the sense of touch of the object by performing control as described above in a manner that depends on the user's operation, interaction with respect to a display device as described above.

The sense can be emphasized. Therefore, a more realistic sense can be expressed even in displaying on a small screen.

Note that this processing can also be executed by determining whether or not it is a line-of-sight region of the user as the line-of-sight information instead of the operation information. That is, processing can be performed only on a region of interest based on detection of the line of sight or a specified region based on a touch position. Therefore, the specular reflection component can be partially emphasized, for example. In contrast, in a case of feeling a too bright video, the specular reflection component can be lowered not to provide the too bright video.

In addition, a reduction in power consumption can be achieved by gradually lowering the specular reflection component in long-duration viewing.

Figure 14:
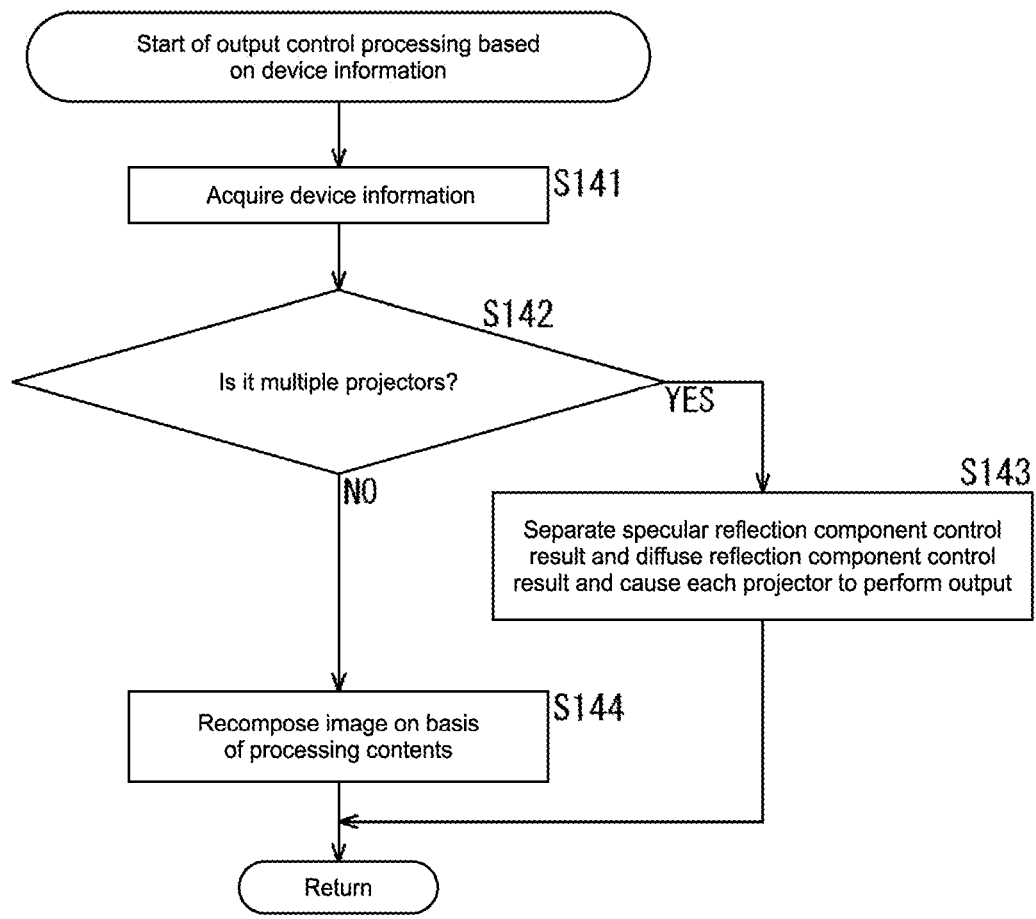
FIG. 14 A flowchart describing output control processing based on device information.

Next, the output control processing based on the device information in Step S17 of FIG. 8 will be described with reference to the flowchart of FIG. 14. Note that the example of FIG. 14 describes the above-mentioned processing example e1 with reference to FIG. 7 and is processing performed by the image processing apparatus 51 of FIG. 4.

In Step S141, the device information analyzer 33 acquires the device information from the devices 31-1 to 31-N and supplies the acquired device information to the characteristic control unit 26.

In Step S142, the characteristic control unit 26 determines whether or not it is the multiple projectors, on the basis of the device information from the device information analyzer 33. In Step S142, if it is determined that it is the multiple projectors, the processing proceeds to Step S143.

Figure 8:
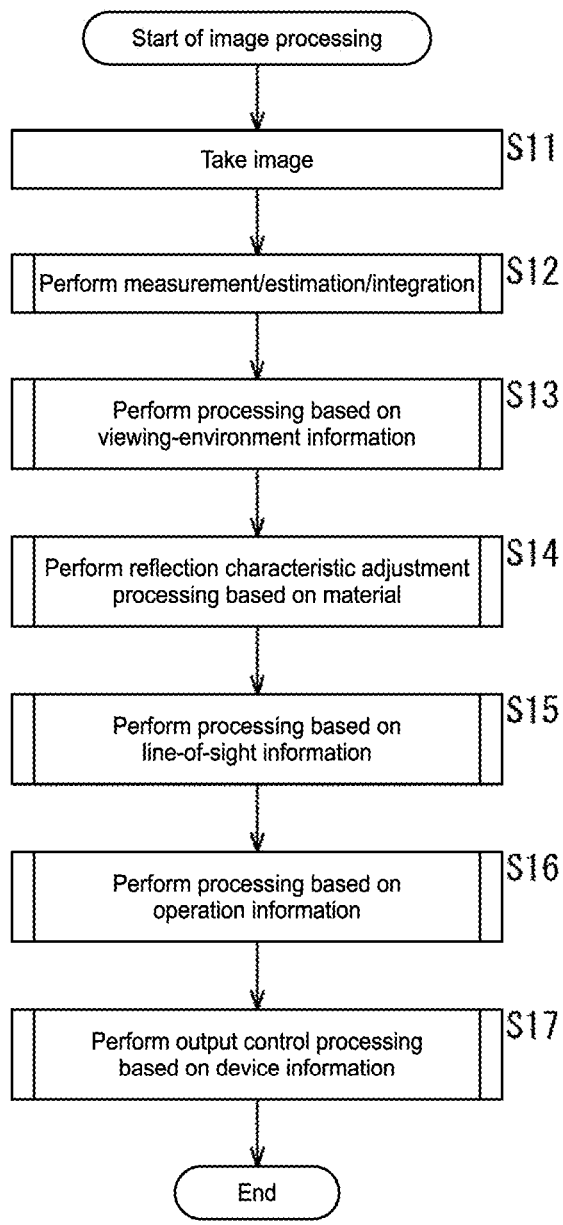
FIG. 8 A flowchart describing image processing of the image processing apparatus of the present technology.
Figure 9:
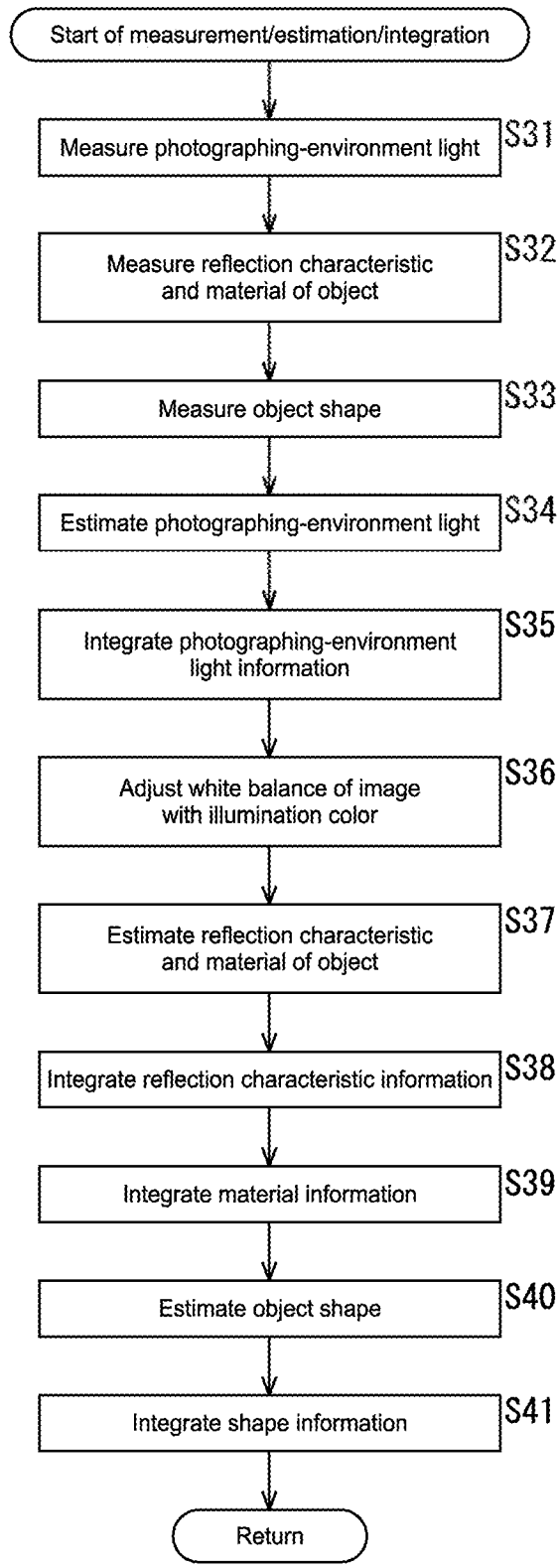
FIG. 9 A flowchart describing measurement/estimation/integration processing.

In Step S143, the characteristic control unit 26 separates the processing contents determined in Step S14 of FIG. 8, that is, a specular reflection component control result and a diffuse reflection component control result and causes each of the projectors (devices 31-1 to 31-N) to output them. That is, in order to cause each of the devices 31-1 to 31-N to output them, the characteristic control unit 26 outputs the processing contents in which the specular reflection component control result and the diffuse reflection component control result are separated, to the image composition units 27-1 to 27-N respectively corresponding to the devices 31-1 to 31-N. In response to this, the image composition units 27-1 to 27-N recomposes the input image on the basis of the determined processing contents of the sense-of-quality control and causes respectively corresponding devices 31-1 to 31-N to output the recomposed image.

On the other hand, in Step S142, if it is determined that it is not the multiple projectors, the processing proceeds to Step S144. That is, since it is not the multiple projectors, only the image composition unit 27-1 and the device 31-1 are the output targets.

Therefore, in Step S144, the image composition unit 27-1 recomposes the input image, on the basis of the processing contents of the sense-of-quality control, which has been determined in Steps S13 to S16 of FIG. 8, and causes each corresponding device 31-1 to output the recomposed image.

As described above, if the multiple projectors are provided as the output devices, the specular reflection/diffuse reflection of the reflection component are used in the plurality of projectors at the same position as the characteristic of the object. Therefore, due to the emphasis of the specular reflection, the effect of enhancing the shininess can be obtained.

Figure 15:
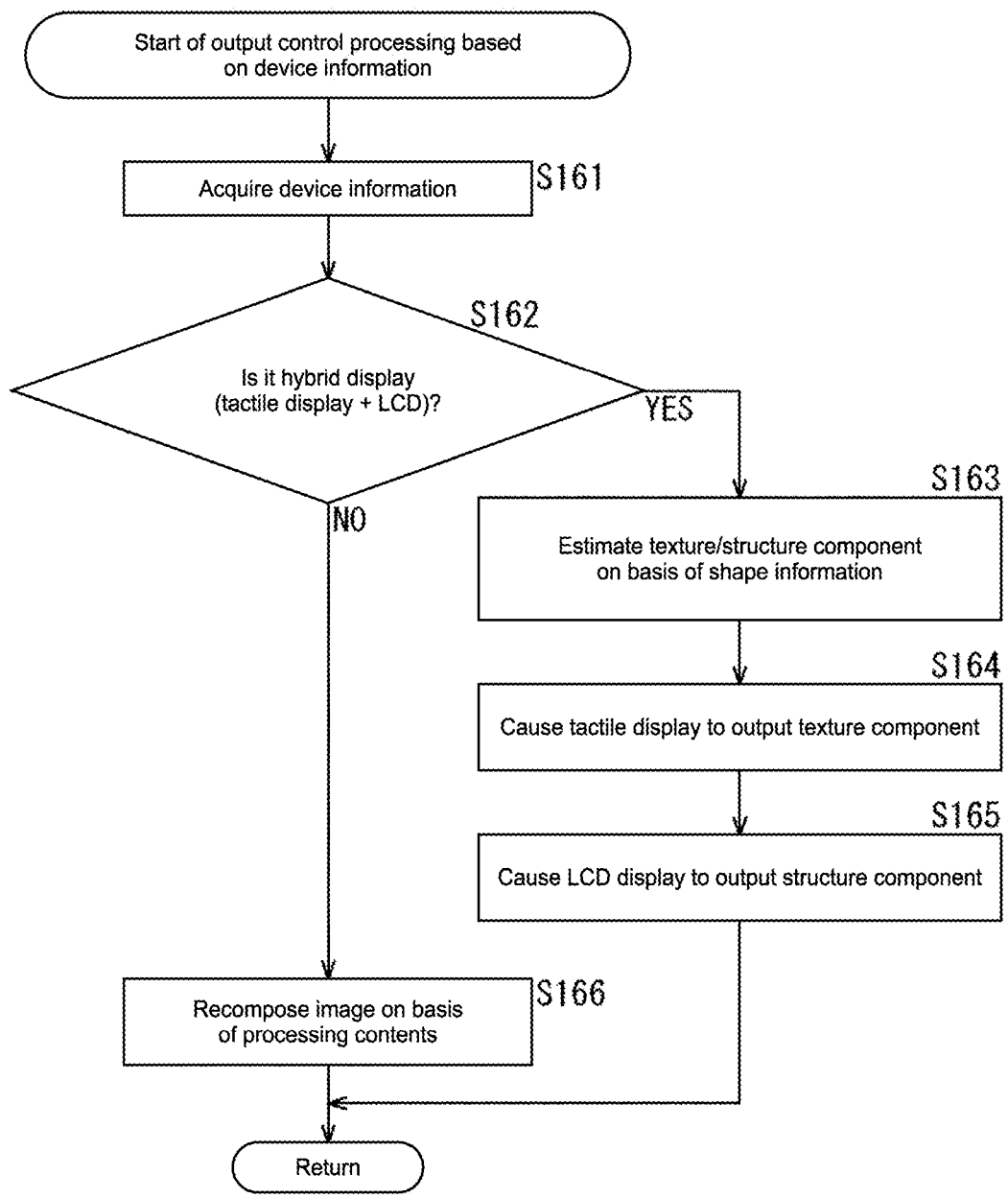
FIG. 15 A flowchart describing output control processing based on device information.

Next, another example of the output control processing based on the device information in Step S17 of FIG. 8 will be described with reference to the flowchart of FIG. 15. Note that the example of FIG. 15 describes the above-mentioned processing example e2 with reference to FIG. 7 and is processing performed by the image processing apparatus 11 of FIG. 3.

In Step S161, the device information analyzer 33 acquires the device information from the devices 31-1 and 31-2 and supplies the acquired device information to the characteristic control unit 26.

In Step S162, the characteristic control unit 26 determines whether or not it is a hybrid display (tactile display+LCD), on the basis of the device information from the device information analyzer 33. For example, if the device 31-1 is an LCD display and the device 31-2 is a tactile display, it is determined in Step S162 that it is the hybrid display and the processing proceeds to Step S163.

In Step S163, the characteristic control unit 26 estimates a texture component and a structure component on the basis of shape information of the object out of the physical characteristic parameters from the characteristic information integration unit 24.

In Step S164, the characteristic control unit 26 causes the tactile display (device 31-2) to output the texture component estimated in Step S163. That is, in order to cause the tactile display (device 31-2) to output it, the characteristic control unit 26 outputs the processing contents indicative of the texture component to the additional-information generation unit 30. Corresponding to this, the additional-information generation unit 30 generates additional information for providing the sense of touch of the texture component and outputs the generated additional information to the device 31-2. With this, the device 31-2 that is the tactile display is capable of performing output corresponding to the sense of touch of the texture component.

Note that if there is little information regarding the sense of touch of the texture component in generating the additional information, information may be obtained from the prior-knowledge database 29.

In Step S165, the characteristic control unit 26 causes the LCD display (device 31-1) to output the structure component estimated in Step S163. That is, in order to cause the LCD display (device 31-1) to output it, the characteristic control unit 26 outputs the processing contents indicative of the structure component to the image composition unit 27. Corresponding to this, the image composition unit 27, the image composition unit 27 recomposes the input image on the basis of the determined processing contents of the sense-of-quality control. With this, the device 31-1 that is the LCD display is capable of performing output corresponding to the structure component.

On the other hand, in Step S162, if it is determined that it is not the hybrid display, the processing proceeds to Step S166. That is, since it is not the hybrid display, only the image composition unit 27 and the device 31-1 are the output targets.

Therefore, in Step S166, the image composition unit 27 recomposes the input image, on the basis of the processing contents of the sense-of-quality control, which has been determined in Steps S13 to S16 of FIG. 8, and causes each corresponding device 31-1 to output the recomposed image.

As described above, if the hybrid display formed of the tactile display and the LCD is provided as the output device, the specular reflection/diffuse reflection of the reflection component are used in the plurality of projectors at the same position as the characteristic of the object. Therefore, due to the emphasis of the specular reflection, the effect of enhancing the shininess can be obtained.

Figure 16:
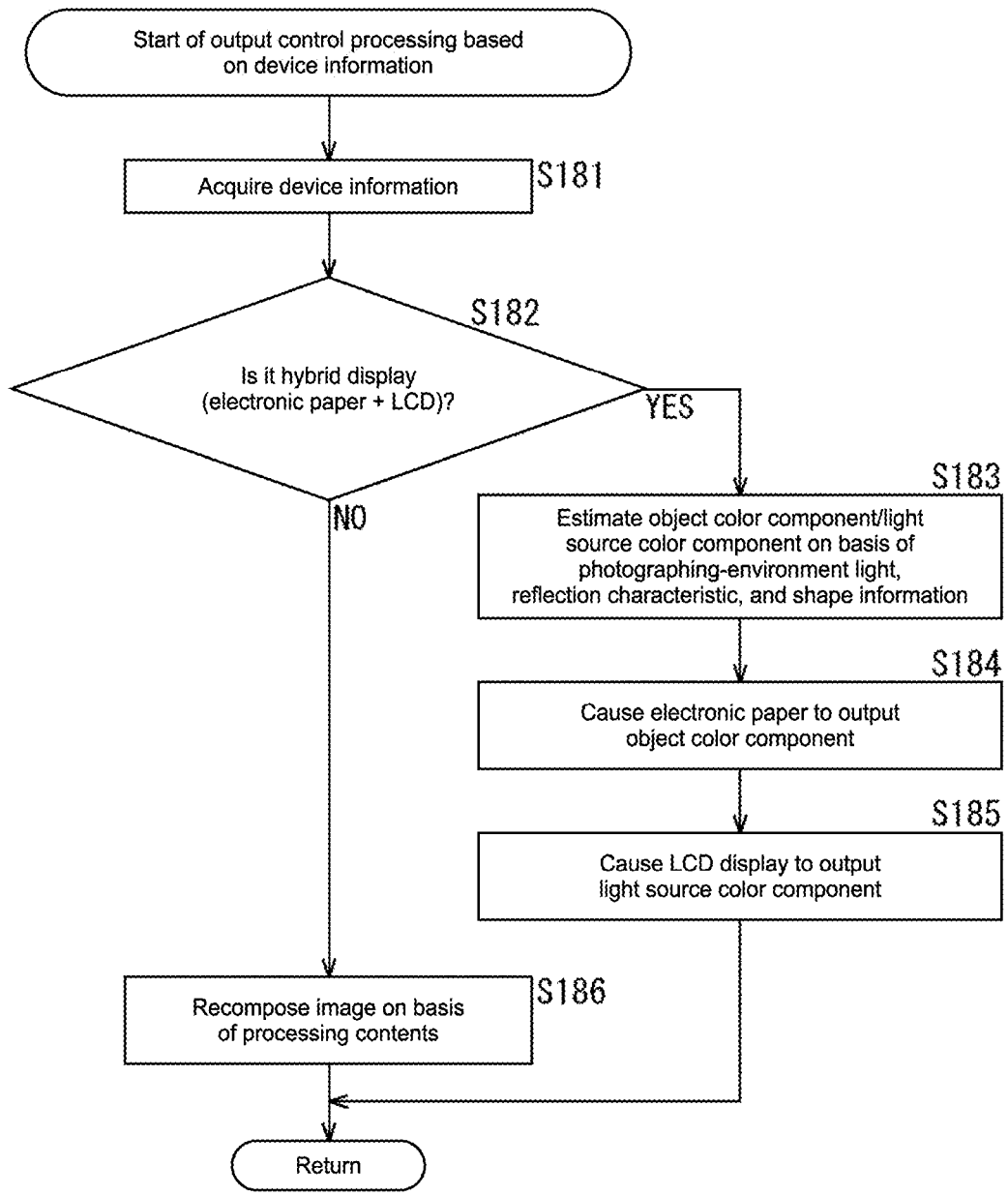
FIG. 16 A flowchart describing output control processing based on device information.

Next, another example of the output control processing based on the device information in Step S17 of FIG. 8 will be described with reference to the flowchart of FIG. 16. Note that the example of FIG. 15 describes the above-mentioned processing example e3 with reference to FIG. 7 and is processing performed by the image processing apparatus 11 of FIG. 4.

In Step S181, the device information analyzer 33 acquires the device information from the devices 31-1 and 31-2 and supplies the acquired device information to the characteristic control unit 26.

In Step S182, the characteristic control unit 26 determines whether or not it is a hybrid display (electronic paper+LCD), on the basis of the device information from the device information analyzer 33. For example, if the device 31-1 is an LCD display and the device 31-2 is an electronic paper, it is determined in Step S182 that it is the hybrid display and the processing proceeds to Step S183.

In Step S183, the characteristic control unit 26 estimates an object color component/light source color component on the basis of photographing-environment light, a reflection characteristic, and shape information of the object out of the physical characteristic parameters from the characteristic information integration unit 24.

In Step S184, the characteristic control unit 26 causes the electronic paper (device 31-2) to output the object color component estimated in Step S183. That is, in order to cause the electronic paper (device 31-2) to output it, the characteristic control unit 26 outputs the processing contents indicative of the object color component to the additional-information generation unit 30. Corresponding to this, the additional-information generation unit 30 generates additional information for outputting the object color component and outputs the generated additional information to the device 31-2. With this, the device 31-2 that is the electronic paper is capable of outputting the object color component.

Note that if there is little information regarding the object color component in generating the additional information, information may be obtained from the prior-knowledge database 29.

In Step S185, the characteristic control unit 26 causes the LCD display (device 31-1) to output the light source color component estimated in Step S183. That is, in order to cause the LCD display (device 31-1) to output it, the characteristic control unit 26 outputs the processing contents indicative of the structure component to the image composition unit 27. Corresponding to this, the image composition unit 27, the image composition unit 27 recomposes the input image on the basis of the determined processing contents of the sense-of-quality control. With this, the device 31-1 that is the LCD display is capable of performing output corresponding to the structure component.

On the other hand, in Step S182, if it is determined that it is not the hybrid display, the processing proceeds to Step S186. That is, since it is not the hybrid display, only the image composition unit 27 and the device 31-1 are the output targets.

Therefore, in Step S186, the image composition unit 27 recomposes the input image, on the basis of the processing contents of the sense-of-quality control, which has been determined in Steps S13 to S16 of FIG. 8, and causes each corresponding device 31-1 to output the recomposed image.

As described above, if the hybrid display formed of the electronic paper and the LCD is provided as the output device, the light source color/object color of the wavelength is utilized as the characteristic of the object and the object color is displayed on the electronic paper and the light source color is displayed on the LCD at the same position. Therefore, the effect of reducing the power consumption can be obtained.

Figure 17:
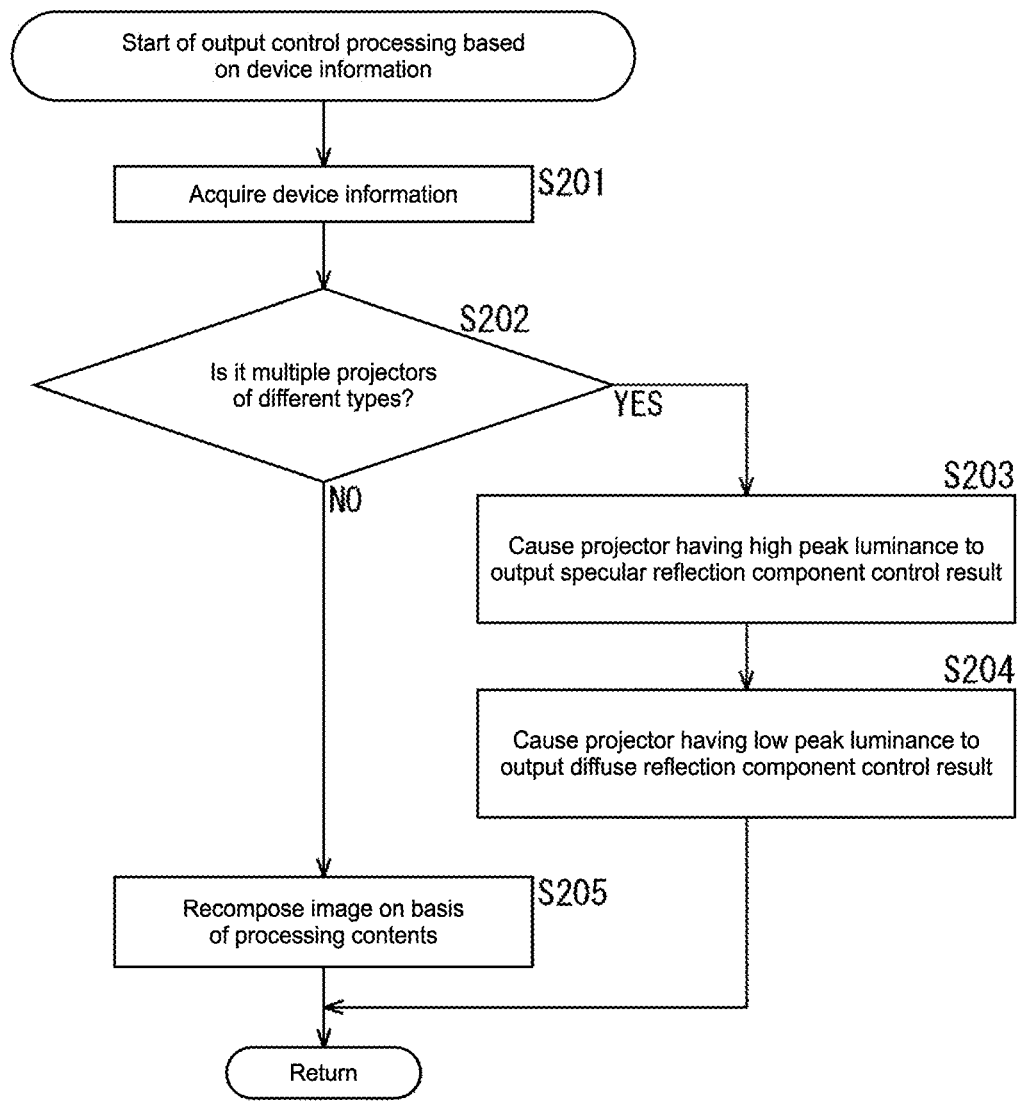
FIG. 17 A flowchart describing output control processing based on device information.

Next, the output control processing based on the device information in Step S17 of FIG. 8 will be described with reference to the flowchart of FIG. 17. Note that the example of FIG. 14 describes the above-mentioned processing example e4 with reference to FIG. 7 and is processing performed by the image processing apparatus 51 of FIG. 4.

In Step S201, the device information analyzer 33 acquires the device information from the devices 31-1 to 31-N and supplies the acquired device information to the characteristic control unit 26.

In Step S202, the characteristic control unit 26 determines whether or not it is the multiple projectors of different types, on the basis of the device information from the device information analyzer 33. In Step S202, if it is determined that it is the multiple projectors of different types, the processing proceeds to Step S203.

In Step S203, the characteristic control unit 26 causes the projector (device 31-1) having a high peak luminance to output the specular reflection component control result of the processing contents determined in Step S14 of FIG. 8. That is, in order to cause the device 31-1 to output it, the characteristic control unit 26 outputs the processing contents indicative of the specular reflection component control result to the image composition unit 27-1 corresponding to the device 31-1. In response to this, the image composition unit 27-1 recomposes the input image on the basis of the determined processing contents of the sense-of-quality control and causes each corresponding device 31-1 to output the recomposed image.

Further, in Step S204, the characteristic control unit 26 causes the projector (device 31-2) having a low peak luminance to output the diffuse reflection component control result of the processing contents determined in Step S14 of FIG. 8. That is, in order to cause the device 31-2 to output it, the characteristic control unit 26 outputs the processing contents indicating the diffuse reflection component control result, to the image composition unit 27-2 corresponding to the device 31-2. In response to this, the image composition unit 27-2 recomposes the input image on the basis of the determined processing contents of the sense-of-quality control and causes each corresponding device 31-2 to output the recomposed image.

On the other hand, in Step S202, if it is determined that it is not the multiple projectors of different types, the processing proceeds to Step S205. That is, since it is not the multiple projectors of different types, only the image composition unit 27-1 and the device 31-1 are the output targets.

Therefore, in Step S205, the image composition unit 27-1 recomposes the input image, on the basis of the processing contents of the sense-of-quality control, which has been determined in Steps S13 to S16 of FIG. 8, and causes each corresponding device 31-1 to output the recomposed image.

As described above, if the multiple projectors of different types are provided as the output devices, as the characteristic of the object, the specular reflection of the reflection component is displayed on a device having a high peak luminance and the diffuse reflection is displayed on a device having a low peak luminance at the same position. Therefore, the effect of enhancing the dynamic range can be obtained.

Note that, although details of the processing will be omitted, also in a case of other processing of FIGS. 6 and 7, the effects shown in FIGS. 6 and 7 can be obtained by performing the processing shown in FIGS. 6 and 7.

As described above, all the physical characteristic parameters obtained at the photographing time or from the image are used. Then, in addition, as long as these physical characteristic parameters are accurately acquired, optimization of illumination light, the enhancement of the shininess, and the reproduction of the transparency in the image are performed by changing them even if the reproducibility of the input image is poor. That is, a situation when the object is actually seen can be visually reproduced like CG (computer graphics).

In the above-mentioned manner, in the present technology, the sense of quality as if there were a real object can be more realistically reproduced. In particular, the image quality and the display method are changed in a manner that depends on the operational environment (user's interaction). Therefore, feelings other than the appearance such as the sense of touch of the object can also be given.

Further, the performance or function information of the output device is acquired and an optimal image is recomposed in a manner that depends on the acquired performance or function of the output device. Therefore, optimal information can be output to the output device. With this, the effect that cannot be obtained only by viewing can be enhanced and a high-order sense can be expressed. As a result, more realistic visual expression becomes possible.

By also outputting tactile sensor information, a sense of touch can be given through a user's touch operation. By also outputting audio information of the object, feelings other than the appearance can be given through a user's touch operation or the like. Further, the result of analyzing the characteristic information of the object can be output as the information other than the image. For example, it includes sound and tactile information expressing a sense of quality, information on a specular reflection component or the like, gamma characteristic information, and color information.

In addition, a plurality of images having different features are output. Therefore, more realistic visual expression becomes possible. Output to the light-field display becomes possible and generation of a viewpoint depending on a viewpoint becomes possible. By outputting the image in a manner that depends on the magnitude of the reflection characteristic to the multi-layer display like the DFD, expression with a stronger stereoscopic sense becomes possible.

By outputting the image in a manner that depends on the magnitude of the reflection characteristic, compatibility between a conventional display and an HDR display can be obtained. By separating and outputting the image as the diffuse reflection component and the specular reflection component, cooperation between the devices can be performed.

In addition, it is possible to perform lift control of the specular reflection component on the OLED or the LCD, a reduction in power consumption and prevention of screen burn-in of a multi-function mobile phone, image composition on a screen by displaying each of the specular reflection component and the diffuse reflection component by using two projectors, and the like.

Note that the present invention can be applied to an image processing apparatus, a television apparatus, a projector, and the like and to a video system including them, and the like.

5. Configuration Example of Computer

[Personal Computer]

The above-mentioned series of processing may be executed by hardware or may be executed by software. If the series of processing is executed by software, programs that configure that software are installed into a computer. Here, the computer includes a computer incorporated in dedicated hardware, a general-purpose personal computer capable of executing various functions by installing various programs, and the like.

Figure 18:
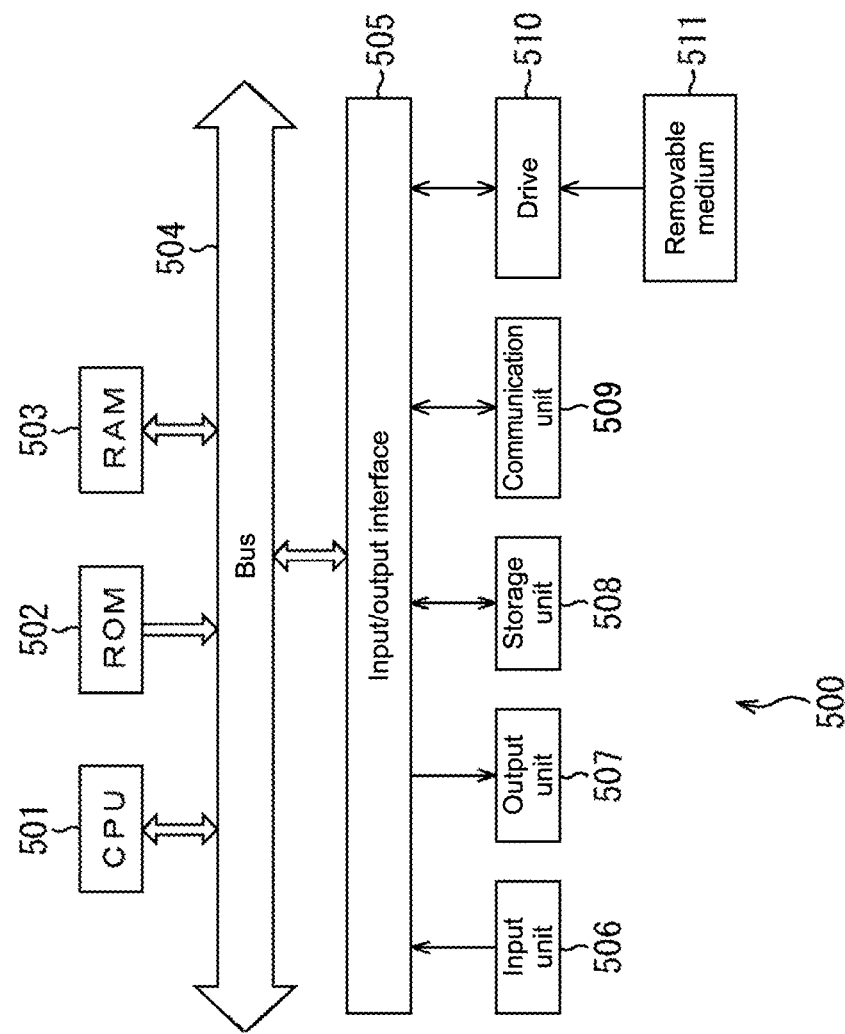
FIG. 18 A block diagram showing a main configuration example of a personal computer.

FIG. 18 is a block diagram showing a configuration example of hardware of a personal computer that executes the above-mentioned series of processing in accordance with programs.

In a personal computer 500, a CPU (Central Processing Unit) 501, a ROM (Read Only Memory) 502, and a RAM (Random Access Memory) 503 are connected to one another through a bus 504.

An input/output interface 505 is further connected to the bus 504. An input unit 506, an output unit 507, a storage unit 508, a communication unit 509, and a drive 510 are connected to the input/output interface 505.

The input unit 506 includes a keyboard, a mouse, a microphone, and the like. The output unit 507 includes a display, a speaker, and the like. The storage unit 508 includes a hard disk, a nonvolatile memory, and the like. The communication unit 509 includes a network interface, and the like. The drive 510 drives a removable medium 511 such as a magnetic disk, an optical disc, a magneto-optical disk, and a semiconductor memory.

As described above, in the personal computer 500 to be configured, the CPU 501 loads programs stored in, for example, the storage unit 508 into the RAM 503 via the input/output interface 505 and the bus 504 and executes them. With this, the above-mentioned series of processing is performed.

The programs executed by the computer (CPU 501) can be stored on the removable medium 511 and provided. The removable medium 511 is, for example, a package medium. The package medium includes a magnetic disk (including flexible disk), an optical disc (CD-ROM (Compact Disc-Read Only Memory), DVD (Digital Versatile Disc), etc.), a magneto-optical disk, a semiconductor memory, and the like. Additionally or alternatively, the programs can be provided via a wired or wireless transmission medium such as a local area network, the Internet, and digital satellite broadcasting.

In the computer, the programs can be installed into the storage unit 508 via the input/output interface 505 by the removable medium 511 being mounted on the drive 510. Further, the programs can be received by the communication unit 509 via the wired or wireless transmission medium and installed into the storage unit 508. Besides, the programs can be installed into the ROM 502 and the storage unit 508 in advance.

Note that the programs executed by the computer may be programs to be processed chronologically in the order described in the present specification or may be programs to be processed concurrently or at necessary stages, for example, upon calling.

Further, in the present specification, steps describing the programs stored in a storage medium include, as a matter of course, processing to be performed chronologically in the order described and also include processing to be concurrently or individually executed without necessarily needing to be processed chronologically.

Further, in the present specification, the system refers to the entire apparatus constituted by a plurality of devices (apparatuses).

Further, the configuration described above as a single apparatus (or processor) may be divided and may be configured as a plurality of apparatuses (or processors). In contrast, the configurations described above as a plurality of apparatuses (or processors) may be unified and configured as a single apparatus (or processor). Further, as a matter of course, a configuration other than those described above may be added to the configuration of each apparatus (or each processor). In addition, as long as the configuration and operation as the entire system are substantially the same, a configuration of a part of a certain apparatus (or processor) may be included in a configuration of another apparatus (or another processor). That is, the present technology is not limited to the above-mentioned embodiments and various modifications can be made without departing from the gist of the present technology.

Although favorable embodiments of the present disclosure have been described in detail with reference to the attached drawings, the present disclosure is not limited to such an example. It is obvious that a person with ordinary skill in the art to which the present disclosure pertains can conceive various changed examples or modified examples within the range of the technical ideas described in the scope of claims and it should be understood that they also fall within the technical range of the present disclosure as a matter of course.

Note that the present technology can also take the following configurations.

(1) An image processing apparatus, including:
a physical-characteristic parameter acquisition unit that acquires a physical characteristic parameter regarding an object of an image;
a sense-of-quality control unit that controls a sense of quality of the object in the image by using the physical characteristic parameter acquired by the physical-characteristic parameter acquisition unit; and
a plurality of output units that respectively output a plurality of pieces of information about the object whose sense of quality has been controlled by the sense-of-quality control unit.

(2) The image processing apparatus according to (1), further including
a function information acquisition unit that acquires function information of the plurality of output units, in which
the sense-of-quality control unit controls the sense of quality of the object in the image by using the physical characteristic parameter and the function information acquired by the function information acquisition unit.

(3) The image processing apparatus according to (1) or (2), in which
the plurality of output units are constituted by display units of a same type that output images about the object.

(4) The image processing apparatus according to (3), in which
the plurality of output units output the images about the object at a same pixel position.

(5) The image processing apparatus according to (1) or (2), in which
the plurality of output units are constituted by
at least one display unit that outputs an image about the object, and
an output unit that outputs information other than the image about the object.

(6) The image processing apparatus according to any of (1) to (5), in which
the physical characteristic parameter is reflection characteristic information indicating a reflection characteristic of the object, and
the output unit outputs the reflection characteristic of the object.

(7) The image processing apparatus according to (6), in which
one output unit outputs a specular reflection component of the reflection characteristic of the object, and
another output unit outputs a diffuse reflection component of the reflection characteristic of the object.

(8) The image processing apparatus according to (7), in which
the one output unit outputs the specular reflection component of the reflection characteristic of the object to a front, and the other output unit outputs the diffuse reflection component of the reflection characteristic of the object to a back.

(9) The image processing apparatus according to any of (1) to (8), in which
the one output unit is a device having a high peak luminance, and
the other output unit is a device having a low peak luminance.

(10) The image processing apparatus according to any of (1) to (9), in which
the physical characteristic parameter is a wavelength of the object, and
the output unit performs output with respect to a wavelength of the object.

(11) The image processing apparatus according to (10), in which
the one output unit is an electronic paper and outputs an object color of the wavelength of the object, and
the other output unit is an LCD (liquid crystal display) and outputs a light source color of the wavelength of the object.

(12) The image processing apparatus according to any of (1) to (11), in which
the physical characteristic parameter is a frequency component of the object, and
the output unit performs output with respect to the frequency component of the object.

(13) The image processing apparatus according to any of (1) to (12), in which
the physical characteristic parameter is the frequency component of the object, and
the output unit performs output with respect to a texture of the frequency component of the object.

(14) The image processing apparatus according to (13), in which
the one output unit is a tactile display and outputs the texture of the frequency component of the object, and
the other output unit is an LCD (liquid crystal display) and outputs a structure of the frequency component of the object.

(15) The image processing apparatus according to any of (1) to (14), in which
the physical characteristic parameter is a depth or deepness of the object, and
the output unit performs output with respect to the depth or deepness of the object.

(16) The image processing apparatus according to any of (1) to (15), in which
the physical characteristic parameter is information on a time direction of the object, and
the output unit performs output with respect to a mobile object and a stationary object in the time direction of the object.

(17) An image processing method, including: by an image processing apparatus,
acquiring a physical characteristic parameter regarding an object of an image;
controlling a sense of quality of the object in the image by using the acquired physical characteristic parameter; and
respectively outputting a plurality of pieces of information about the object whose sense of quality has been controlled, to a plurality of display units.

REFERENCE SIGNS LIST

1 measurement and estimation block, 2 real-world modeling block, 3 sense-of-quality control block, 4 rendering and retouch block, 11 image processing apparatus, 21 photographing-environment information acquisition unit, 22 photographing-environment information analyzer, 23 object characteristic analyzer, 24 characteristic information integration unit, 25 viewing-environment information analyzer, 26 characteristic control unit, 27-1 to 27-N image composition unit, 28 operational environment information interpretation unit, 29 prior-knowledge database, 30 additional-information generation unit, 31-1 to 31-N device, 33 device information analyzer, 51 image processing apparatus

The invention claimed is:
1. An image processing apparatus, comprising:
a plurality of output devices; and
a central processing unit (CPU) configured to:
acquire a physical characteristic parameter of an object in a first image, wherein the physical characteristic parameter indicates a reflection characteristic of the object;
acquire function information of the plurality of output devices; and
control a sense of quality parameter of the object in the first image based on the acquired physical characteristic parameter of the object and the acquired function information of the plurality of output devices, wherein
a first output device, of the plurality of output devices, is configured to output a specular reflection component of the reflection characteristic of the object based on the controlled sense of quality parameter of the object,
a second output device, of the plurality of output devices, is configured to output a diffuse reflection component of the reflection characteristic of the object based on the controlled sense of quality parameter of the object, and
the second output device is on a back side of the first output device.

2. The image processing apparatus according to claim 1, wherein
the plurality of output devices corresponds to a plurality of display devices of a same type, and
the plurality of display devices is configured to output a plurality of output images of the object.

3. The image processing apparatus according to claim 2, wherein
a first display device of the plurality of display devices is configured to output a first output image of the plurality of output images of the object at a first pixel position on the first display device,
a second display device of the plurality of display devices is configured to output a second output image of the plurality of output images at a second pixel position on the second display device, and
the first pixel position is similar to the second pixel position.

4. The image processing apparatus according to claim 1, wherein the plurality of output devices includes:
at least one display device configured to output a second image of the object; and
a third output device of the plurality of output devices is configured to output information other than the second image of the object.

5. The image processing apparatus according to claim 1, wherein
the first output device has a higher peak luminance than the plurality of output devices other than the first output device, and the second output device has a lower peak luminance than the plurality of output devices other than the second output device.

6. An image processing method, comprising:

in an image processing apparatus:

acquiring a physical characteristic parameter of an object in an image, wherein the physical characteristic parameter indicates a reflection characteristic of the object;

acquiring function information of a plurality of output devices;

controlling a sense of quality parameter of the object in the image based on the acquired physical characteristic parameter of the object and the acquired function information of the plurality of output devices;

outputting, by a first output device of the plurality of output devices, a specular reflection component of the reflection characteristic of the object based on the controlled sense of quality parameter of the object; and outputting, by a second output device of the plurality of output devices, a diffuse reflection component of the reflection characteristic of the object based on the controlled sense of quality parameter of the object, wherein the second output device is on a back side of the first output device.

* * * * *